(12) United States Patent
Arai

(10) Patent No.: US 12,197,552 B2
(45) Date of Patent: Jan. 14, 2025

(54) AUTHENTICATION DEVICE AND AUTHENTICATION SYSTEM

(71) Applicants: KABUSHIKI KAISHA TOSHIBA, Tokyo (JP); Toshiba Infrastructure Systems & Solutions Corporation, Kawasaki-shi (JP)

(72) Inventor: Hideaki Arai, Yokohama Kanagawa (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 240 days.

(21) Appl. No.: 17/815,581

(22) Filed: Jul. 28, 2022

(65) Prior Publication Data

US 2022/0374506 A1  Nov. 24, 2022

Related U.S. Application Data

(63) Continuation of application No. PCT/JP2021/001454, filed on Jan. 18, 2021.

(30) Foreign Application Priority Data

Jan. 30, 2020  (JP) .................................. 2020-013353

(51) Int. Cl.
*G06F 21/32* (2013.01)

(52) U.S. Cl.
CPC .................................... *G06F 21/32* (2013.01)

(58) Field of Classification Search
CPC ........................................................ G06F 21/32
See application file for complete search history.

(56) References Cited

U.S. PATENT DOCUMENTS 6,182,221 B1 * 1/2001 Hsu ........................ G07C 9/28
726/19
10,679,036 B2  6/2020 Nagano
(Continued)

FOREIGN PATENT DOCUMENTS

CN     110572304 A    12/2019
JP    2003-304480 A    10/2003
(Continued)

OTHER PUBLICATIONS

Japan Patent Office, International Search Report in PCT/JP2021/001454 (Apr. 13, 2021).
(Continued)

*Primary Examiner* — Stephen T Gundry
(74) *Attorney, Agent, or Firm* — Finnegan, Henderson, Farabow, Garrett & Dunner, LLP

(57) ABSTRACT

According to an embodiment, an authentication device includes an apparatus main body interface, a memory, a biosensor, and a processor. The apparatus main body interface communicates with an apparatus main body controlling a locking mechanism. The memory stores therein biological information of a registrant. The biosensor acquires biological information The processor transmits information that an operator has been authenticated as the registrant with the biological information to the apparatus main body and controlles the locking mechanism, when the processor determines that the biological information acquired with the biosensor and the biological information of the registrant are pieces of biological information of the same person.

8 Claims, 12 Drawing Sheets

(56) References Cited

U.S. PATENT DOCUMENTS

| | | |
|---|---|---|
| 2006/0129826 A1 | 6/2006 | Azuchi |
| 2006/0163344 A1 | 7/2006 | Nwosu |
| 2006/0176146 A1 | 8/2006 | Krishan et al. |
| 2009/0064296 A1* | 3/2009 | Aikawa .............. H04W 12/06 726/6 |
| 2010/0316262 A1 | 12/2010 | Kuwahara |
| 2018/0048471 A1* | 2/2018 | Yasaki .............. H04W 12/50 |
| 2019/0334889 A1* | 10/2019 | Ito .............. H04L 63/0853 |
| 2020/0019682 A1* | 1/2020 | Lee .............. H04L 63/0853 |
| 2020/0356751 A1* | 11/2020 | Matsuda .............. G06F 21/32 |
| 2021/0019975 A1* | 1/2021 | Tanaka .............. G07F 7/0813 |
| 2021/0118276 A1* | 4/2021 | Matsuzawa .............. G06F 1/163 |
| 2021/0216617 A1* | 7/2021 | Semba .............. G06T 7/00 |
| 2021/0232671 A1* | 7/2021 | Ando .............. G06F 21/32 |
| 2021/0326592 A1* | 10/2021 | Minagawa .............. G06F 21/556 |
| 2022/0058256 A1* | 2/2022 | Lee .............. G06F 21/35 |
| 2022/0156349 A1* | 5/2022 | Tsukada .............. G06V 40/107 |
| 2022/0253518 A1* | 8/2022 | Toshimitsu .......... H04L 63/0861 |
| 2022/0261462 A1* | 8/2022 | Tokuyama .............. G06F 21/32 |
| 2022/0270105 A1* | 8/2022 | Kawase .............. G06F 21/30 |
| 2022/0350873 A1* | 11/2022 | Kato .............. G06F 21/45 |
| 2022/0368520 A1* | 11/2022 | Toshimitsu ......... G07C 9/00563 |
| 2022/0405368 A1* | 12/2022 | Hayase .............. G07C 9/38 |
| 2022/0417359 A1* | 12/2022 | Tokuyama ......... H04M 1/72454 |
| 2023/0021132 A1* | 1/2023 | Shimada .............. H04W 4/60 |
| 2023/0177215 A1* | 6/2023 | Yoshizawa ............ G06F 21/604 726/27 |

FOREIGN PATENT DOCUMENTS

| | | |
|---|---|---|
| JP | 2004-190381 A | 7/2004 |
| JP | 2006-268831 A | 10/2006 |
| JP | 2007-134908 A | 5/2007 |
| JP | 2010-287124 A | 12/2010 |
| JP | 2012-159627 A | 8/2012 |
| JP | 2015-78529 A | 4/2015 |
| JP | 2018-5775 A | 1/2018 |
| WO | WO 2009/081570 A1 | 7/2009 |

OTHER PUBLICATIONS

European Patent Office, Extended European Search Report in EP 21747617.5, 6 Pages (Jan. 23, 2024).

Intellectual Property Office of Singapore, Office Action in SG App. No. 11202251653E, 10 pages (Jul. 23, 2024).

* cited by examiner

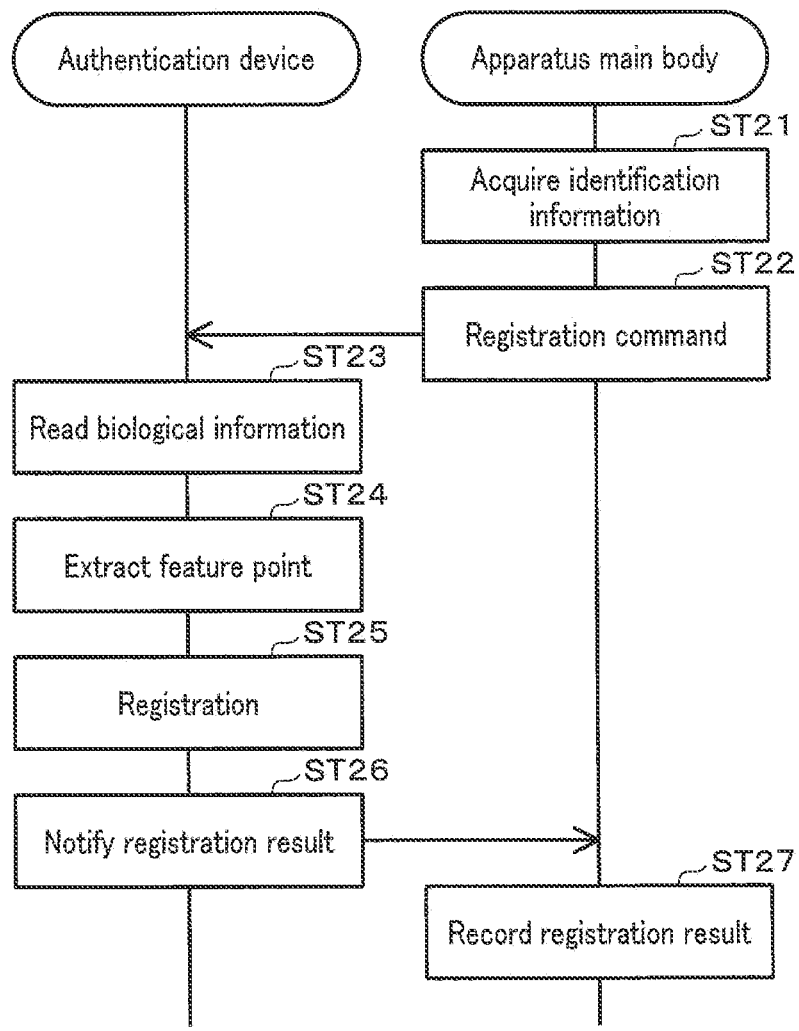
F I G. 4

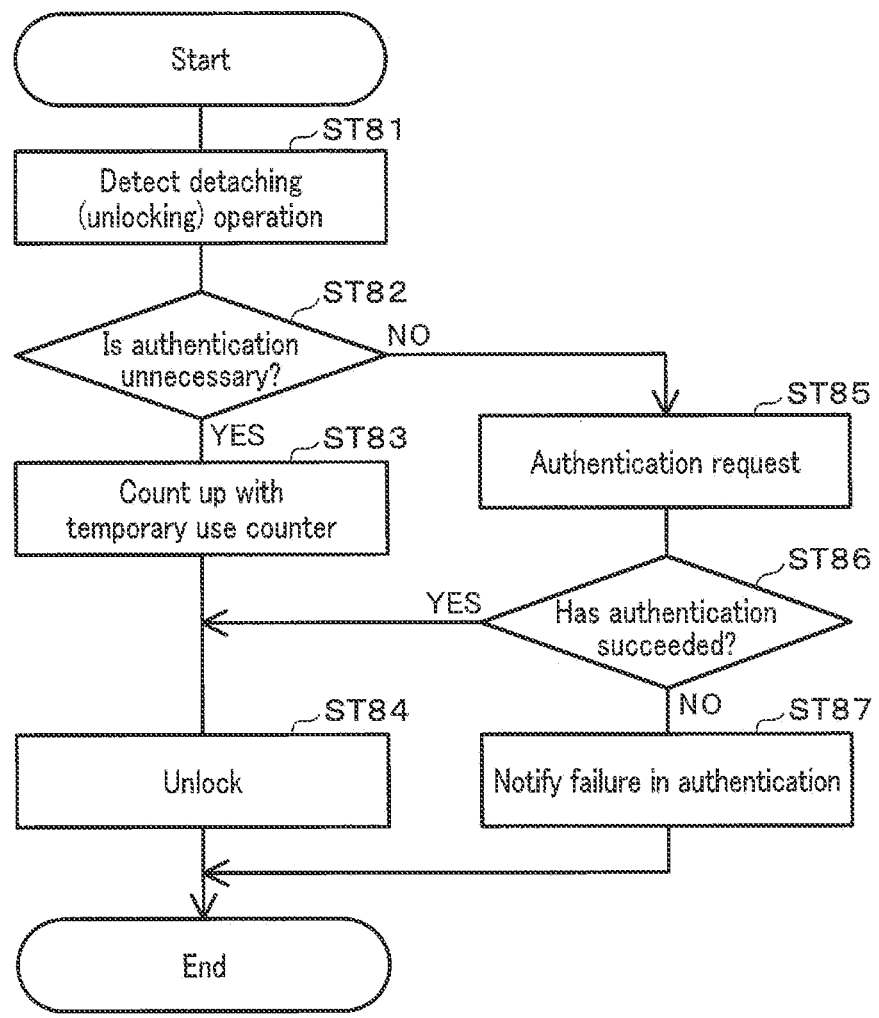
F I G. 9

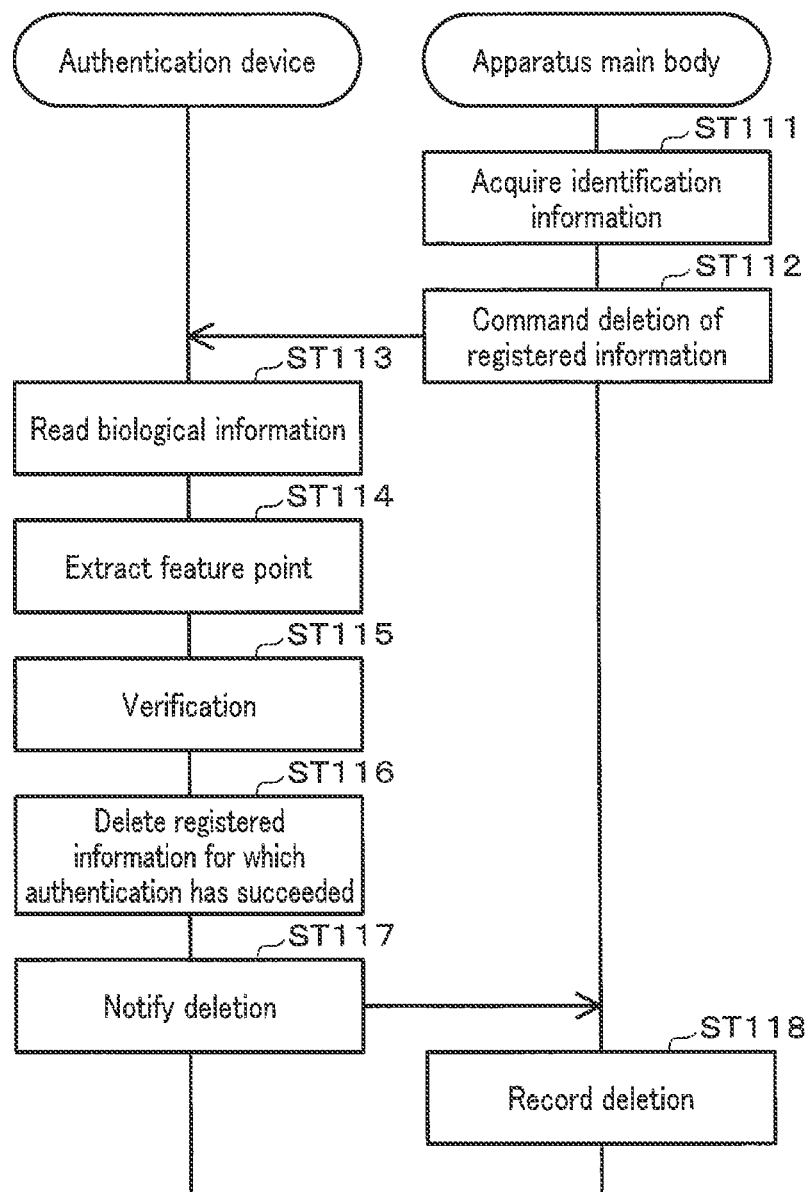
F I G. 11

AUTHENTICATION DEVICE AND AUTHENTICATION SYSTEM

CROSS REFERENCE TO RELATED APPLICATIONS

This application is a Continuation application of PCT Application No. PCT/JP2021/001454, filed Jan. 18, 2021 and based upon and claiming the benefit of priority from Japanese Patent Application No. 2020-013353, filed Jan. 30, 2020, the entire contents of all of which are incorporated herein by reference.

FIELD

Embodiments described herein relate generally to an authentication device and an authentication system.

BACKGROUND

In recent years, there are systems achieving security for apparatuses and electronic keys by personal authentication using biological information. For example, some lenses detachable from cameras are very expensive, and require prevention of theft or unauthorized use by a third person. For this reason, a structure has been proposed in conventional art. In the structure, a fingerprint sensor is attached to the lens, and the lens can be used by personal authentication using a fingerprint.

However, conventional personal authentication using a fingerprint sensor attached to a lens has a problem that usability decreases while security becomes firm. For example, when the lens is temporarily lent or transferred to another person, it is required to execute operations, such as deletion of the user's fingerprint data and reregistration of fingerprint data, and convenience is reduced. In addition, when using or attaching the lens, even the user (owner) whose fingerprint data has been registered is required to execute an operation to cause the fingerprint sensor attached to the lens itself to read the fingerprint every time, and such a structure can hardly be considered to be a structure achieving good operability.

PRIOR ART LITERATURES

Patent Literatures

Patent Literature 1: Japanese Patent Application Publication No. 2012-159627

SUMMARY OF INVENTION

According to an embodiment, an authentication device includes an apparatus main body interface, a memory, a biosensor, and a processor. The apparatus main body interface communicates with an apparatus main body controlling a locking mechanism. The memory stores therein biological information of a registrant having authority to release lock executed with the locking mechanism. The biosensor acquires biological information of an operator. The processor transmits information that the operator has been authenticated as the registrant with the biological information to the apparatus main body with the apparatus main body interface and controls the locking mechanism, when the processor determines that the biological information acquired with the biosensor and the biological information of the registrant stored in the memory are pieces of biological information of the same person.

Problem to be Solved by Invention

To solve the problem described above, embodiments provide an authentication device and an authentication system achieving convenient security using personal authentication with biological information.

Means for Solving the Problem

BRIEF EXPLANATION OF DRAWINGS

FIG. 4 is a timing chart for explaining second registration processing in the authentication system according to the embodiment;

FIG. 9 is a flowchart for explaining a control operation corresponding to setting information of temporary use processing in an apparatus main body of the authentication system according to the embodiment;

FIG. 11 is a timing chart for explaining second deletion processing in the authentication system according to the embodiment;

EMBODIMENT

The following is an explanation of an embodiment with reference to drawings.

Figure 1:
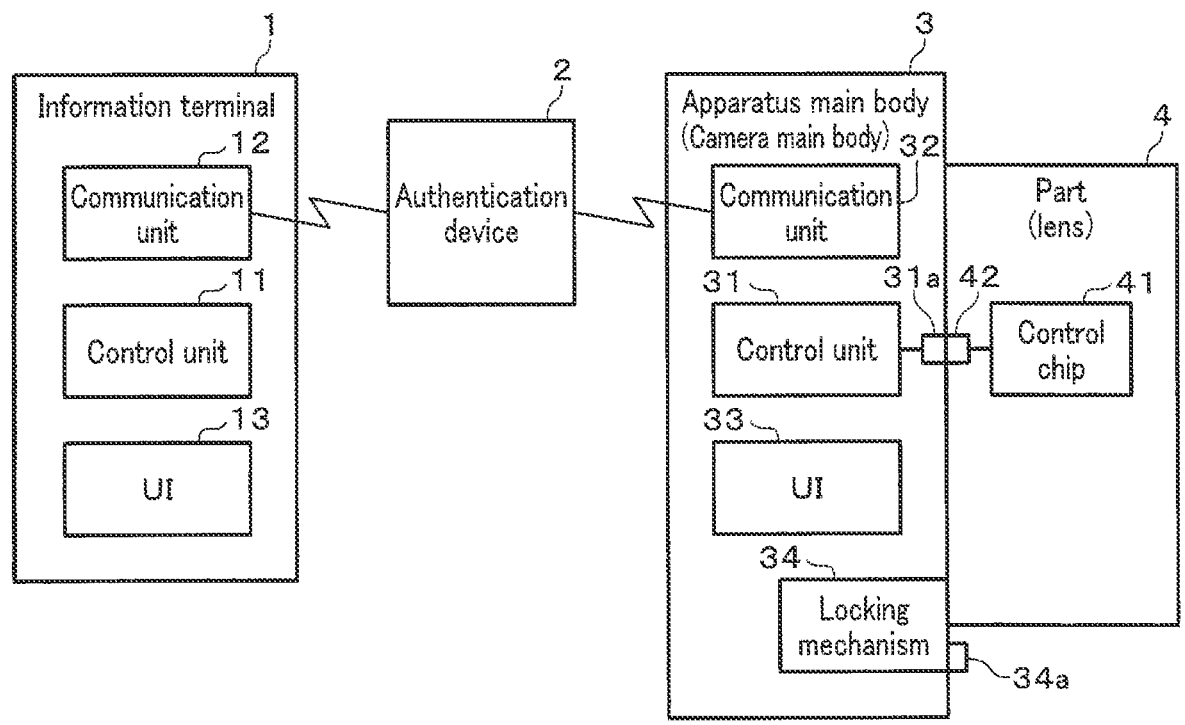
FIG. 1 is a block diagram illustrating a configuration example of an authentication system including an authentication device according to an embodiment.

FIG. 1 is a block diagram illustrating a configuration example of an authentication system according to an embodiment.

As illustrated in FIG. 1, the authentication system includes an information terminal 1, an authentication device 2, and an apparatus main body 3 from which a part 4 is detachable. The authentication system is a system authenticating a person using biological information, such as a fingerprint image (fingerprint image), and controlling an operation of the apparatus main body 3 or the part 4 in accordance with personal authentication using the biological information.

The information terminal 1 is an information processing apparatus communicatable with the authentication device 2. For example, the information terminal 1 is a smartphone or a portable terminal, such as a tablet personal computer. The information terminal 1 may be any terminal connected to and communicating with the authentication device 2, and supplying an operation instruction to the authentication device 2.

The authentication device 2 acquires biological information of the person (operator), and executes authentication of the person on the basis of the acquired biological information. The authentication device 2 is a device designed for biometrics authentication, and formed of a housing different from those of the information terminal 1 and the apparatus main body 3. The authentication device 2 executes biometrics authentication in accordance with a request from the information terminal 1 or the apparatus main body 3 connected thereto to perform communication.

The apparatus main body 3 is an apparatus including an electronic apparatus achieving functions, such as data processing and communication. For example, the apparatus main body 3 is a camera including a control electronic apparatus. In the present embodiment, suppose that the apparatus main body 3 is a camera from which a lens serving as the part 4 is detachable. The camera serving as the apparatus main body 3 is electrically connected to the lens serving as the attached part 4, and acquires lens information including identification information (part ID) and the like from a control chip included in the lens. The apparatus main body 3 being a camera or the like also has a structure to which the part 4, such as a lens, is attachable, and includes a locking mechanism (described later) locking the attached part 4, such as a lens. The lens 4 is detachable from the apparatus main body (camera) 3 by a manual operation, in a state in which lock executed with the locking mechanism is released.

The following is an explanation of configuration of the information terminal 1 in the authentication system according to the embodiment.

As illustrated in FIG. 1, the information terminal 1 includes a control unit 11, a communication unit, and a user interface (UI) 13.

The control unit 11 includes a processor, various types of memories, and an interface. The control unit 11 controls the units connected thereto via the interface by execution of a program stored in the memory with the processor. In the present embodiment, the control unit 11 issues an operation instruction to the authentication device, by execution of a dedicated application program installed in the memory with the processor.

The communication unit 12 is a communication interface (authentication device interface) to communicate with the authentication device 2. The communication unit 12 may execute wireless communication or wired communication. For example, the communication unit 12 supports wired or wireless LAN (Local Area Network) connection. A wired or wireless interface compliant with various communication standards may be adopted as the communication unit 12. Examples of the various communication standards include Ethernet (registered trademark), Wi-Fi, BLE, and LTE (registered trademark).

The user interface 13 acquires information input by the user, and notifies the user of information. The UI 13 is, for example, a display device including a touch panel serving as an operating unit. As another example, the UI 13 may be a device including a speaker outputting voice or a microphone receiving voice.

The following is an explanation of a configuration example of the apparatus main body (camera) 3 and the part (lens) 4 in the authentication system according to the embodiment.

In addition to the original structure of the apparatus main body (such as a camera), the apparatus main body 3 includes a control unit 31, a connection interface 31a, a communication unit 32, a user interface (UI) 33, and a locking mechanism 34, as illustrated in FIG. 1.

The control unit 31 includes a processor, various types of memories, and an interface. The control unit 31 controls the units connected thereto via the interface by execution of a program stored in the memory with the processor. For example, the control unit 31 requests the authentication device 2 to execute biometrics authentication, and receives a result of the biometrics authentication from the authentication device 2. The control unit 31 controls the locking mechanism 34 to enable or disable detachment of the part 4.

The control unit 31 is electrically connected to the part 4 via the connection interface 31a. The connection interface 31a is an interface to electrically connect to the part 4 to execute transmission and reception of data to and from the part 4. For example, the connection interface 31a has a structure including a connector contacting a connector provided on the part 4 attached to a predetermined position.

The communication unit 32 is a communication interface (authentication device interface) to communicate with the authentication device 2. The communication unit 32 may execute wireless communication or wired communication. For example, the communication unit 32 is achieved with a wireless communication interface, such as Bluetooth (registered trademark).

The user interface 33 acquires information input by the user, and notifies the user of information. The user interface 33 is, for example, a display device including a touch panel serving as an operating unit. When the apparatus main body 3 is a camera, the user interface 33 may be a display device provided with a touch panel displaying an image input to an imaging unit via the lens 4 or the photographed image. As another example, the user interface 33 may be a device including a speaker outputting voice or a microphone receiving voice.

The locking mechanism 34 is a mechanism holding the part 4 attached to the apparatus main body 3. The locking mechanism 34 enables or disables detachment of the part 4 in accordance with a control signal from the control unit 31. For example, the locking mechanism 34 includes a release button 34a to enable detachment of the part 4 in a state in which the release button 34a is pressed down. In this case, the locking mechanism 34 causes the release button 34a to be available (pressable) to enable detachment of the part 4, or causes the release button 34a inavailable (unpressable) to disable detachment of the part 4, in accordance with a control signal from the control unit 31.

In addition to the original structure of the part, the part 4 includes a control chip 41 and a connection interface 41a, as illustrated in FIG. 1.

The control chip 41 includes a processor, various types of memories, and an interface. For example, the control chip 41 executes control to output part (lens) information including identification information (part ID) of the part (lens) stored in the memory to the apparatus main body 3.

The processor of the control chip 41 in the part 4 is configured to communicate with the control unit 31 of the apparatus main body 3 via the connection interface 41a. The connection interface 41a is an interface to electrically connect to the apparatus main body 3. For example, the connection interface 41a is a connector contacting a connector provided on the apparatus main body 3, in a state of being attached to a predetermined position of the apparatus main body 3.

The following is an explanation of configuration of the authentication device 2 according to the embodiment.

Figure 2:
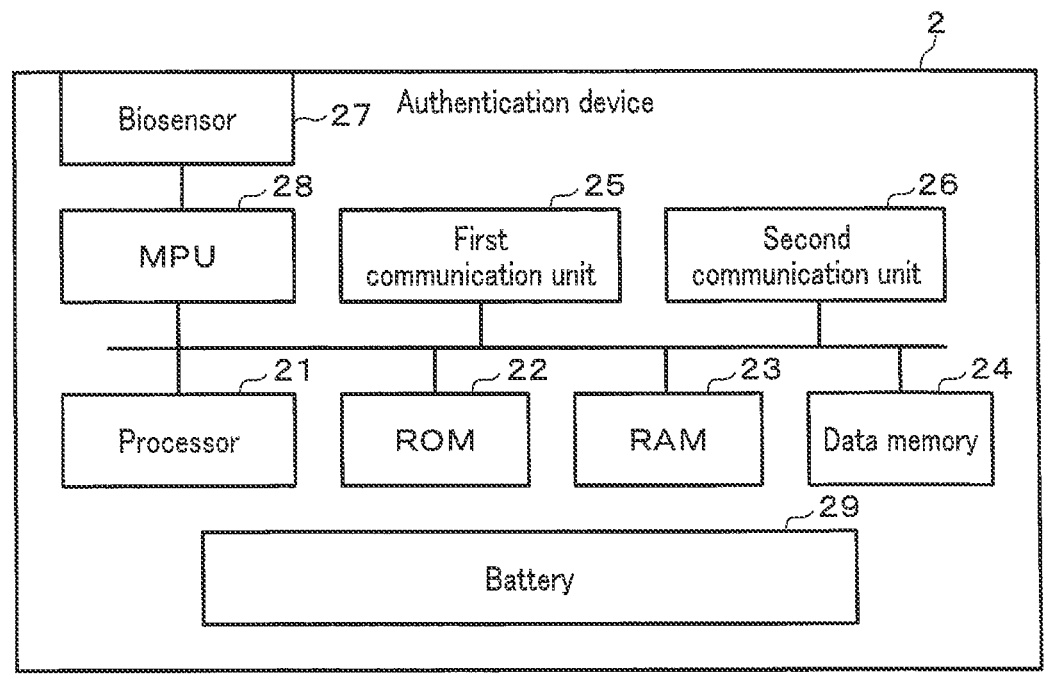
FIG. 2 is a block diagram illustrating a configuration example of a control system in the authentication device according to the embodiment.

FIG. 2 is a block diagram illustrating a configuration example of the authentication device 2 according to the embodiment.

As illustrated in FIG. 2, the authentication device 2 includes a processor 21, a ROM 22, a RAM 23, a data memory 24, a first communication unit 25, a second communication unit 26, a biosensor 27, a MPU 28, and a battery 29.

The authentication device 2 is formed of, for example, a housing containing the processor 21, the ROM 22, the RAM 23, the data memory 24, the first communication unit 25, the second communication unit 26, the biosensor 27, and the MPU 28, and exposing the biosensor 27 to the outside. The housing serving as the authentication device 2 may be miniaturized to a size enough to expose the biosensor 27 capable of reading biological information (a fingerprint image of a fingertip), and can be achieved with a size of approximately several centimeters square, for example.

The processor 21 executes processing and control required for operations of the authentication device 2. The processor 21 achieves various processing functions of the authentication device 2 by executing a program stored in, for example, the ROM 22 or the data memory 24. The processor 21 controls the units in the authentication device 2. For example, the processor 21 verifies the biological information acquired with the biosensor 27 with the biological information registered in advance in the data memory 24.

The processor 21 may be, for example, a CPU (Central Processing Unit), a SoC (System on a Chip), a DSP (Digital Signal Processor), or a GPU (Graphics Processing Unit). As another example, the processor 21 may be a combination thereof.

Part of various functions achieved with the processor 21 by execution of the program may be achieved with a hardware circuit. In this case, the processor 21 controls the function executed with the hardware circuit.

The ROM 22 is a nonvolatile memory storing a control program and control data or the like in advance. The ROM 22 is incorporated into the authentication device 2 at the manufacturing stage, in a state of storing the control program and the control data and the like. Specifically, the control program and the control data stored in the ROM 22 are incorporated in advance in accordance with the specifications of the authentication device 2 and the like.

The RAM 23 is a volatile memory. The RAM 23 temporarily stores data being processed with the processor 21. For example, the RAM 23 functions as a calculation buffer, a reception buffer, and a transmission buffer. The calculation buffer temporarily retains results of various types of arithmetic processing executed with the processor 21. The reception buffer retains command data and the like received via the first communication unit 25 or the second communication unit 26. The transmission buffer retains a message (response data) transmitted with the first communication unit 25 or the second communication unit 26.

The data memory 24 is formed of a rewritable nonvolatile memory. The data memory 24 may have a structure including a memory storing data and an encryption logic circuit and the like. The data memory 24 encrypts and stores the biological information (fingerprint herein) registered in advance and/or data acquired by extracting feature points from the biological information. In the following explanation, the term "biological information" includes data acquired by extracting feature points from biological information. The data memory 24 also includes a secure element securely retaining data. For example, the secure element of the data memory 24 encrypts and stores biological information.

The first communication unit 25 is a communication interface (information terminal interface) to communicate with the information terminal 1. For example, a communication interface serving as the first communication unit 25 may adopt a wired or wireless interface compliant with the communication standard supporting wired or wireless LAN (Local Area Network) connection.

The second communication unit 26 is a communication interface (apparatus main body interface) to communicate with the apparatus main body 3. For example, the second communication unit 26 may be achieved with an interface communicating with the apparatus main body 3 by near field communication, such as Bluetooth.

The first communication unit 25 and the second communication unit 26 may be achieved with one communication interface or different communication interfaces.

The biosensor 27 is formed of a sensor reading biological information of the user. The biosensor 27 acquires a fingerprint from one of fingers as biological information of the user. The biosensor 27 may acquire biological information other than a fingerprint. For example, the biosensor 27 may be a vein sensor acquiring a vein pattern of a finger as image data.

For example, the fingerprint sensor serving as the biosensor 27 acquires a fingerprint image from a finger of the user. The fingerprint sensor acquires a fingerprint image to generate a template. For example, the fingerprint sensor includes a CCD sensor or the like. As another example, the fingerprint sensor may include a sensor sensing a change of electric capacity. The fingerprint sensor transmits a fingerprint image to the MPU 28.

The MPU 28 (Micro Processing Unit) processes data including biological information from the biosensor 27. For example, the MPU 28 processes a fingerprint image from the fingerprint sensor serving as the biosensor 27. The MPU 28 extracts feature point information (information indicating coordinates of the feature points and feature quantities) from the fingerprint image from the fingerprint sensor. The MPU 28 transmits the extracted feature point information to the processor 21.

The MPU 28 also executes verification processing for the biological information from the biosensor 27. For example, the MPU 28 executes verification processing for the fingerprint images from the fingerprint sensor serving as the biosensor 27. In this case, the MPU 28 calculates similarity between the fingerprint images. The MPU 28 transmits the calculated similarity to the processor 21. In this example, the similarity serves as an index, and similarity having a higher value indicates higher similarity between fingerprint images.

For example, the MPU 28 extracts feature point information of respective fingerprint images. In accordance with a predetermined algorithm, the MPU 28 calculates similarity between pieces of the extracted feature point information, as the similarity between the fingerprint images. The MPU 28 transmits the calculated similarity to the processor 21. In addition, the MPU 28 executes verification processing for the template and the fingerprint image. For example, the MPU 28 may calculate similarity between the template and the fingerprint image and transmit the similarity to the processor 21. As another example, the MPU 28 may transmit the result (success or failure) of the verification to the processor 21.

The battery 29 supplies electric power to the units of the authentication device 2. The battery 29 is, for example, a secondary battery. The battery 29 may be feed via a USB terminal in a wired manner.

The authentication device 2 may include a display or speaker reporting the operating state or the like. The display may be, for example, a LED (Light Emitting Diode), or may be achieved with a small-sized display device.

As described above, the authentication device 2 operates by execution of the program stored in the ROM 22 or the NVM 24 or the like with the processor 21. In the present embodiment, the authentication device 2 achieves authentication of a person using a fingerprint image serving as biological information with the MPU 28. The authentication processing for a person using biological information may be achieved by execution of the program with the processor 21.

The following is an explanation of operations of the authentication system including the authentication device 2 according to the embodiment.

First, the following is an explanation of a first operation example (first registration processing) of registration processing of registering biological information in the authentication device 2 in the authentication system.

Figure 3:
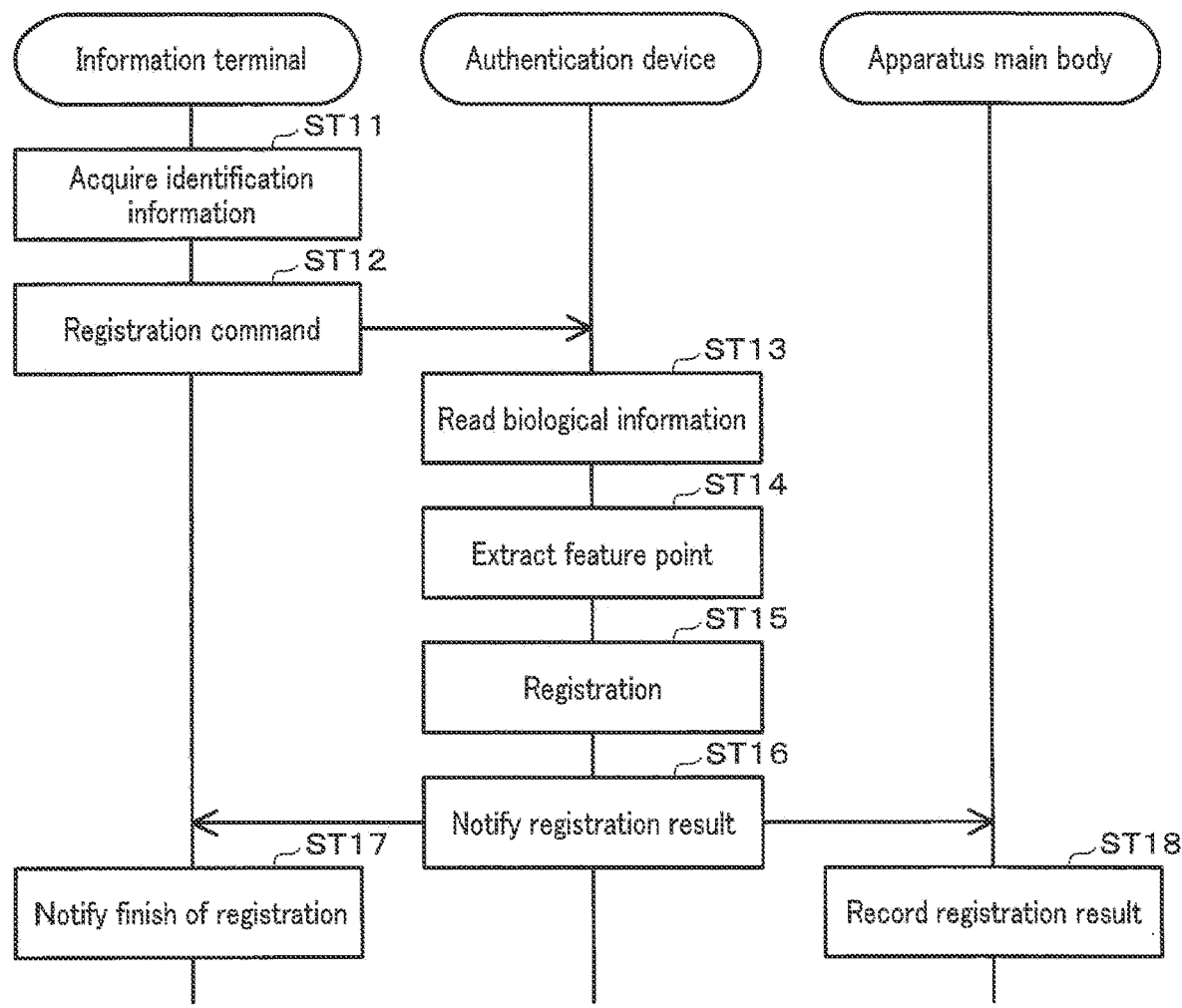
FIG. 3 is a timing chart for explaining first registration processing in the authentication system according to the embodiment.

FIG. 3 is a timing chart for explaining first registration processing in the authentication system according to the embodiment.

In this example, suppose that the first registration processing is processing of registering, in the authentication device 2, biological information of a person (authorized user) having authority to use the part 4 to be attached to the apparatus main body 3, in accordance with a request from the information terminal 1, such as a smartphone, operated by the manager.

First, the manager commands registration of biological information by operating the user interface 13 of the information terminal 1. For example, the manager inputs identification information (part ID) provided to the part 4 serving as the management target, as identification information to identify the management target with the user interface 13, and commands registration of biological information of the authorized user for the part 4. The identification information may include identification information (apparatus ID) of the apparatus main body, or include the part ID and the apparatus ID. As another example, the manager may input user information of the authorized user (registrant), such as the user name, together with the identification information.

The control unit 11 of the information terminal 1 acquires identification information input with the user interface 13 (ST11), and receives a command to register biological information corresponding to the identification information. When the control unit 11 receives a command to register biological information, the control unit 11 connects to and communicates with the authentication device 2 with the communication unit 12, and transmits a command requesting registration of biological information in association with the acquired identification information to the authentication device 2 (ST12). The control unit 11 may guide the registrant using the user interface 13 to place a finger on which the fingerprint is formed in a reading position in the biosensor 27 of the authentication device 2.

The authentication device 2 receives a command from the information terminal 1 with the first communication unit 25. When the command received from the information terminal 1 is a command requesting registration of biological information, the processor 21 of the authentication device 2 executes registration processing for biological information. In the registration processing, the processor 21 acquires a fingerprint image serving as the biological information of the registrant using the biosensor 27 and the MFP 28.

In this operation, suppose that the person (registrant) going to registering biological information places a finger on which a fingerprint is formed in a predetermined reading position in the biosensor 27. In the present embodiment, suppose that the person (registrant) serving as the biological information registration target is a person (such as the owner) to be permitted to use the part 4. The registrant whose biological information is registered may be the same person as, or a different person from, the manager operating the information terminal 1. The latter case achieves an operation in which the manager who is not the registrant causes the registrant to execute registration of biological information while performing remote operation with the information terminal 1.

The biosensor 27 starts in accordance with an instruction from the processor 21. The started biosensor 27 acquires a read image including a fingerprint image from the person's finger placed in the predetermined reading position (ST13). The biosensor 27 transmits the acquired read image to the MPU 28. The MPU 28 acquires a fingerprint image from the read image from the biosensor 27. The MPU 28 extracts feature point information in the acquired fingerprint image (ST14). The MPU 28 transmits the extracted feature point information as biological information of the registrant to the processor 21.

The processor 21 acquires feature point information of the fingerprint image from the MPU 28. When the processor 21 acquires feature point information of the fingerprint image of the registrant, the processor 21 generates a template (data acquired by extracting feature points for biometrics authentication) on the basis of the acquired feature point information of the fingerprint image. For example, the processor 21 generates a template from the feature point information of the fingerprint image in accordance with a predetermined algorithm.

In this operation, the processor 21 may repeat the operation described above after feature point information of the fingerprint image is acquired. By repeating the operation described above, the processor 21 may acquire a plurality of pieces of feature point information of a plurality of fingerprint images, and generate a template on the basis of the acquired pieces of feature point information of the fingerprint images. Because a plurality of pieces of feature point information of a plurality of fingerprint images are acquired from a registrant with a certain degree of variation, and a template based on a plurality of pieces of feature point information of a plurality of fingerprint images is expected to improve accuracy in biometrics authentication.

When the processor 21 generates the template for biometrics authentication, the processor 21 stores (registers) the generated template in association with identification information in the data memory 24 (ST15). As another example, the processor 21 may store the generated template in the memory included in the MPU 28.

When the processor 21 registers the template, the processor 21 transmits a response to the information terminal 1

(ST16) via the first communication unit 25. The response indicates that the biological information of the authorized user (registrant) has been registered as a template corresponding to the designated identification information.

When the control unit 11 of the information terminal 1 receives the response indicating that registration has been finished from the authentication device 2 via the communication unit 12, the control unit 11 notifies the manager (operator of the information terminal 1) of finish of registration using the user interface 13 (ST17).

The processor 21 of the authentication device 2 also notifies the apparatus main body 3 of finish of registration of the template serving as biological information of the authorized user via the second communication unit 26 (ST16). In response to it, the apparatus main body 3 receives notification of finish of registration of biological information with the communication unit 32. When the control unit 31 of the apparatus main body 3 receives notification of finish of registration of biological information, the control unit 31 records that the biological information of the authorized user for the part 4 has been registered (ST18). For example, the control unit 31 stores information indicating that the biological information of the authorized user for the part 4 has been registered in the authentication device 2 in the memory in the control unit 31. The control unit 31 may determine that detachment of the part 4 requires personal authentication when information indicating that the biological information has been registered is recorded.

The following is an explanation of a second operation example (second registration processing) of registration processing of registering biological information in the authentication device 2 in the authentication system.

FIG. 4 is a timing chart for explaining second registration processing in the authentication system according to the embodiment.

In this operation, the second registration processing is processing of registering biological information of a person serving as a user of the apparatus main body 3 in the authentication device 2, in accordance with a request from the apparatus main body 3 operated by the user (user). The control unit 31 of the apparatus main body 3 has a function of acquiring part information including the part ID from the control chip 41 of the attached part 4, and a function of requesting the authentication device 2 to register or authenticate the biological information.

First, the user commands registration of biological information by operating the user interface 33 in the apparatus main body 3 in a state in which the part 4 is attached thereto. The user (registrant) who has commanded registration of the biological information places one's finger having a fingerprint to be registered in a reading position of the biosensor 27 in the authentication device 2.

The control unit 31 of the apparatus main body 3 communicates with the control chip 41 of the attached part 4 via the connection interface 31a, and acquires part information including the part ID serving as identification information of the part 4 (ST21). The control unit 31 may communicate with the control chip 41 of the part 4 to acquire the part information when registration of biological information is commanded. As another example, the control unit 31 may acquire part information when the part 4 is attached, and retain the acquired part information in the memory. In this case, the control unit 31 should read the part information retained in the memory when registration of biological information is commanded.

When the part information is acquired, the control unit 31 connects to and communicates with the authentication device 2 with the communication unit 32. When communication connection to the authentication device 2 is established, the control unit 31 transmits a command requesting registration of biological information of the authorized user in association with identification information including the acquired part ID to the authentication device 2 (ST22). The identification information may be information including the part ID and the identification information of the apparatus main body 3.

The authentication device 2 receives the command requesting registration of biological information from the apparatus main body 3 with the second communication unit 26. When the command requesting registration of biological information is received from the apparatus main body 3, the processor 21 of the authentication device 2 executes registration processing for the biological information in the same manner as the processing at ST13 to ST15 described above.

Specifically, the processor 21 acquires a fingerprint image serving as the biological information of the registrant using the biosensor 27. For example, the processor 21 starts the biosensor 27 via the MPU 28 or the like. The biosensor 27 having started in accordance with an instruction from the processor 21 acquires a read image including a fingerprint image from the person's finger placed in the predetermined reading position (ST23).

The biosensor 27 transmits the acquired read image to the MPU 28. The MPU 28 extracts the fingerprint image from the read image acquired from the biosensor 27, and extracts feature point information in the extracted fingerprint image (ST24). The MPU 28 transmits the extracted feature point information as the biological information of the registrant to the processor 21. In this manner, the processor 21 acquires the feature point information of the fingerprint image from the MPU 28.

When the feature point information of the fingerprint image of the registrant is acquired, the processor 21 generates a template (data acquired by extracting the feature points for biometrics authentication) on the basis of the acquired feature point information of the fingerprint image. In this operation, the processor 21 may acquire a plurality of pieces of feature point information for a plurality of fingerprint images, and generate a template on the basis of the acquired pieces of feature point information of the fingerprint images. When a template for biometrics authentication is generated, the processor 21 stores (registers) the generated template in the data memory 24 or the MPU 28 in association with the identification information (ST25).

When the template is registered, the processor 21 transmits a response to the apparatus main body 3 via the second communication unit 26 (ST26). The response indicates finish of registration of the template serving as biological information of the authorized user for the part 4.

The control unit 31 of the apparatus main body 3 receives the response indicating finish of registration from the authentication device 2 via the communication unit 32. When the response indicating finish of registration is received, the control unit 31 records that the biological information of the authorized user for the part 4 has been registered (ST28). For example, the control unit 31 stores information indicating that the biological information of the authorized user for the part 4 has been registered in the authentication device 2 in the memory in the control unit 31. The control unit 31 may determine that detachment of the part 4 requires personal authentication when information indicating that the biological information has been registered is recorded.

As another example, the control unit 31 of the apparatus main body 3 may notify finish of registration of the biological information using the user interface 33, when the control unit 31 receives a response indicating finish of registration of the biological information from the authentication device 2.

As described above, the authentication system according to the embodiment is capable of registering biological information of the user for the part attached to the apparatus main body in the authentication device by the first or the second registration processing. In addition, in the first registration processing, the biological information of the authorized user (person having unlocking authority) of the part is registered in the authentication device in accordance with an instruction from the information terminal. In the second registration processing, the biological information of the authorized user (person having unlocking authority) of the part attached to the apparatus main body is registered in the authentication device in accordance with an instruction from the apparatus main body.

The following is an explanation of a first example (first authentication processing) of authentication processing of controlling lock executed with the locking mechanism 34 of the apparatus main body 3 in accordance with the result of biometrics authentication executed with the authentication device 2 in the authentication system.

Figure 5:
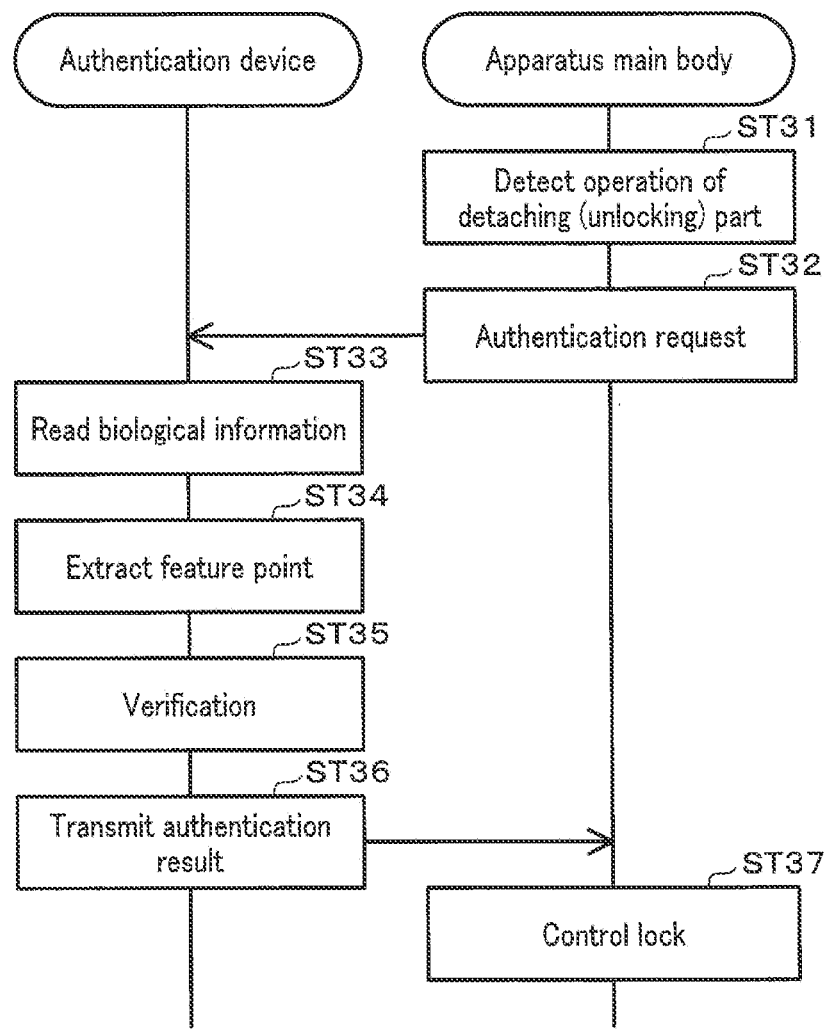
FIG. 5 is a timing chart for explaining first authentication processing in the authentication system according to the embodiment.

FIG. 5 is a timing chart for explaining first authentication processing in the authentication system according to the embodiment.

The first authentication processing is processing of executing biometrics authentication with the authentication device 2 in accordance with a request from the apparatus main body 3, and controlling lock executed with the locking mechanism 34 in the apparatus main body 3 in accordance with the result of the biometrics authentication.

The control unit 31 of the apparatus main body 3 detects a detachment operation (unlocking operation) as an operation to detach the part 4 by the user (ST31). For example, the control unit 31 detects a command to detach the part 4 input by the user using the user interface 33 as a detachment operation. As another example, the control unit 31 may detect a user's operation of the release button 34a, and detect the operation of the release button 34a as the detachment operation.

When a detachment operation for the part 4 is detected, the control unit 31 communicates with the authentication device 2 with the communication unit 32, and transmits a command requesting biometrics authentication to the authentication device 2 (ST32). The control unit 31 transmits identification information including the part ID of the part 4 attached to the apparatus main body 3, together with the command requesting biometrics authentication. In this operation, the control unit 31 may acquire the part ID from the control chip 41 of the part 4, or retain the part information including the part ID and acquired when the part 4 is attached in the memory and read the part ID retained in the memory.

In the present embodiment, authentication is executed using the biological information of the registrant corresponding to the part 4, but authentication may be executed using the biological information of the registrant associated with the apparatus main body 3. In this case, the identification ID should include the identification information (apparatus ID) of the apparatus main body 3. As another example, authentication may be executed using the biological information of the registrant corresponding to a combination of the apparatus main body 3 and the part 4. In this case, the identification ID should include the apparatus ID and the part ID.

The authentication device 2 receives a command requesting biometrics authentication from the apparatus main body 3 with the second communication unit 26. When the authentication device 2 receives the command requesting registration of the biological information from the apparatus main body 3, the processor 21 of the authentication device 2 reads an image including a fingerprint image serving as the biological information with the biosensor 27 (ST33). In this operation, the finger of the operator (person to be authenticated) is placed in the reading position of the biosensor 27. As another example, the biosensor 27 may sense placement of the operator's finger and execute reading of an image.

The biosensor 27 transmits the read image (read image) to the MPU 28. The MPU 28 acquires a fingerprint image serving as the biological information included in the read image from the biosensor 27. When the biological information is acquired from the image read with the biosensor 27, the MPU 28 extracts feature point information in the acquired fingerprint image (ST34). The MPU 28 transmits the extracted feature point information as the biological information of the operator to the processor 21. In this manner, the processor 21 acquires feature point information of the fingerprint image of the operator from the MPU 28.

When the processor 21 acquires the feature point information of the fingerprint image of the operator, the processor 21 executes biometrics authentication by collating the feature point information of the fingerprint image of the operator with the feature point information of the fingerprint image of the registrant (ST35). The processor 21 acquires the feature point information of the fingerprint image of the registrant as the biological information of the registrant corresponding to the identification information received together with the command. The processor 21 executes authentication processing of collating the feature point information of the fingerprint image read with the biosensor 27 with the feature point information of the fingerprint image of the registrant and determining whether the fingerprint images belong to the same person.

For example, the processor 21 inputs the feature point information of the fingerprint image acquired this time with the feature point information of the fingerprint image of the registrant to cause the MPU 28 to calculate similarity. The processor 21 acquires the calculated similarity from the MPU 28. When the processor 21 acquires the similarity, the processor 21 determines whether the similarity exceeds a predetermined threshold (threshold with which it is determined that the operator and the registrant are the same person). When the similarity exceeds the threshold, the processor 21 identifies the operator whose biological information has been read with the biosensor 27 as the registrant, that is, the processor 21 determines that the pieces of the biological information belong to the same person. When the similarity is equal to or smaller than the threshold, the processor 21 determines that the operator whose biological information has been read with the biosensor 27 has not been identified as the registrant.

When biometrics authentication by verification of pieces of feature point information is finished, the processor 21 transmits a response including a result of biometrics authentication using the fingerprint image serving as the biological information to the apparatus main body 3 with the second communication unit 26 (ST36).

The processor 21 may display the result of biometrics authentication on a display provided on the authentication device 2. For example, the processor 21 may turns on a blue LED serving as a display when biometrics authentication succeeds, and turn on a red LED when biometrics authentication ends in failure. As another example, the processor 21 may turn on a LED when biometrics authentication succeeds, and blink the LED when biometrics authentication ends in failure.

The control unit 31 of the apparatus main body 3 receives a response indicating the result of biometrics authentication from the authentication device 2 via the communication unit 32. The control unit 31 executes an operation of controlling the locking mechanism in accordance with the result of biometrics authentication executed with the authentication device 2 (ST37). For example, when the control unit 31 receives a response indicating success in biometrics authentication from the authentication device 2, the control unit 31 unlocks the part 4 locked with the locking mechanism 34 to enable detachment of the part 4. In addition, when the control unit 31 receives a response indicating failure in biometrics authentication from the authentication device 2, the control unit 31 maintains the part 4 in the locked state with the locking mechanism 34 to perform control to prevent detachment of the part 4.

The control unit 31 may notify the result of biometrics authentication executed with the authentication device 2 or the state of the locking mechanism 34 caused in accordance with the result of biometrics authentication, with a display device serving as the user interface 33 or the like. For example, when the biometrics authentication succeeds, the control unit 31 notifies, with the user interface 33, that the biometrics authentication has succeeded or the part 4 is detachable. In addition, when the biometrics authentication ends in failure, the control unit 31 may notify, with the user interface 33, that the biometrics authentication has ended in failure or the part 4 is not detachable.

The following is an explanation of a second example (second authentication processing) of authentication processing of controlling the locking mechanism of the apparatus main body 3 in accordance with the result of biometrics authentication executed with the authentication device 2 in the authentication system.

Figure 6:
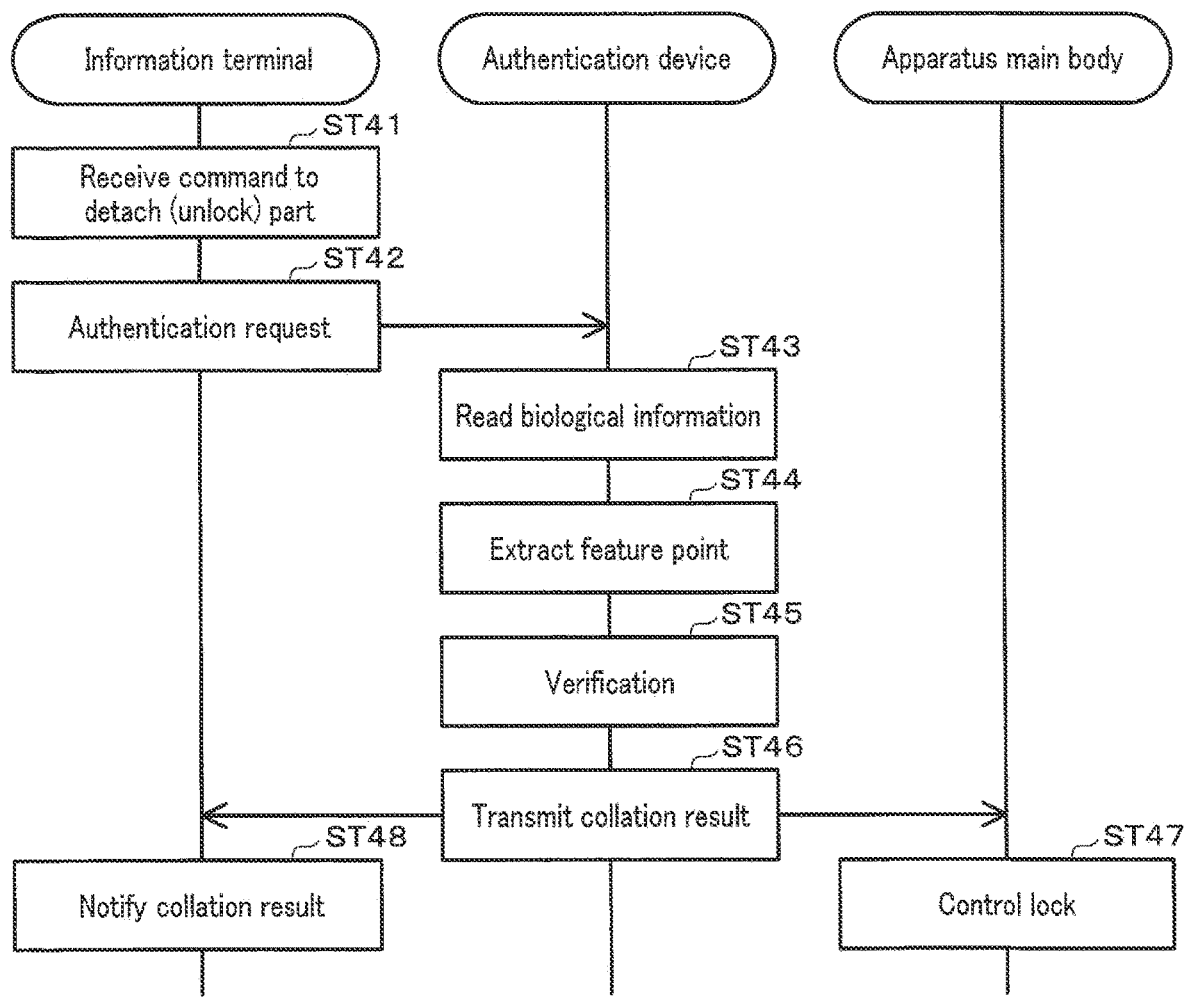
FIG. 6 is a timing chart for explaining second authentication processing in the authentication system according to the embodiment.

FIG. 6 is a timing chart for explaining second authentication processing in the authentication system.

In this example, the second authentication processing is processing of executing biometrics authentication with the authentication device 2 in accordance with a request from the information terminal 1, such as a smartphone operated by the user (manager), and controlling lock of the part 4 with the apparatus main body 34 in accordance with the result of the biometrics authentication.

First, the control unit 11 of the information terminal 1 causes the manager who is operating the information terminal 1 to designate the part 4 to be detached from the apparatus main body 3 (ST41). For example, the control unit 11 of the information terminal 1 causes the manager to select the part to be detached from the parts registered in advance with the UI 13. As another example, the control unit 11 may detect the apparatus main body communicatable with the authentication device 2 serving as the communication destination, and causes the manager to select the part serving as the target from the parts attached to the detected apparatus main body. As another example, the control unit 11 may cause the manager to directly input the identification information (part ID) of the part serving as the target with the UI 13 or the like.

As another example, the control unit 11 of the information terminal 1 may cause the manager to designate the apparatus main body 3 from which the part 4 is to be detached. For example, the control unit 11 may cause the manager to select the apparatus main body serving as the target from the apparatus main bodies registered in advance, cause the manager to select the apparatus main body serving as the target from the apparatus main bodies capable of communicating with the authentication device 2 serving as the communication destination, or cause the manager to directly input the identification information (apparatus ID) of the apparatus main body 3.

When the part 4 to be detached is designated from the apparatus main body 3, the control unit 11 communicates with the authentication device 2 with the communication unit 12, and transmits a command requesting biometrics authentication to the authentication device 2 (ST42). In this operation, the control unit 11 transmits identification information including identification information (part ID) indicating the designated part, together with the command requesting biometrics authentication.

In the present embodiment, authentication is executed using the biological information of the registrant having authority to use the part 4, but authentication may be executed using the biological information of the registrant having authority to use the apparatus main body 3. In this case, the identification information should include identification information (apparatus ID) of the apparatus main body 3. As another example, authentication may be executed using the biological information of the registrant corresponding to a combination of the apparatus main body 3 and the part 4. In this case, the identification information should include the apparatus ID and the part ID.

The authentication device 2 receives a command requesting biometrics authentication from the information terminal 1 with the first communication unit 25. When the processor 21 of the authentication device 2 receives a command requesting biometrics authentication from the information terminal 1, the processor 21 reads an image including a fingerprint image serving as biological information of the operator using the biosensor 27 (ST43). In this operation, the operator's finger is placed in the reading position of the biosensor 27. The biosensor 27 may sense placement of the operator's finger in the reading position and execute reading of an image.

The biosensor 27 transmits the read image (read image) to the MPU 28. The MPU 28 acquires a fingerprint image serving as biological information included in the read image from the biosensor 27. When the MPU 28 acquires biological information from the image read with the biosensor 27, the MPU 28 extracts feature point information in the acquired fingerprint image (ST44). The MPU 28 transmits the extracted feature point information as the biological information of the operator to the processor 21. In this manner, the processor 21 acquires feature point information of the fingerprint image of the operator from the MPU 28.

When the processor 21 acquires the feature point information of the fingerprint image of the operator, the processor 21 executes biometrics authentication by collating the feature point information of the fingerprint image of the operator with the feature point information of the fingerprint image of the registrant (ST45). The processor 21 acquires the feature point information of the fingerprint image as the biological information of the registrant corresponding to the identification information received together with the command. The processor 21 executes authentication processing of collating the feature point information of the fingerprint image of the operator read with the biosensor 27 with the feature point information of the fingerprint image of the registrant and determining whether the fingerprint images belong to the same person.

For example, the processor 21 inputs the feature point information of the fingerprint image of the operator acquired this time with the feature point information of the fingerprint image of the registrant to cause the MPU 28 to calculate similarity. The processor 21 acquires the calculated similarity from the MPU 28. When the processor 21 acquires the similarity, the processor 21 determines whether the similarity exceeds a predetermined threshold (threshold with which it is determined that the operator and the registrant are the same person). When the similarity exceeds the threshold, the processor 21 identifies the operator whose biological information has been read with the biosensor 27 as the registrant, that is, the processor 21 determines that the pieces of the biological information belong to the same person. When the similarity is equal to or smaller than the threshold, the processor 21 determines that the operator whose biological information has been read with the biosensor 27 has not been identified as the registrant.

When biometrics authentication by verification of pieces of feature point information is finished, the processor 21 transmits data indicating a result of biometrics authentication using the fingerprint image serving as the biological information to the apparatus main body 3 with the second communication unit 26 (ST46).

The control unit 31 of the apparatus main body 3 receives data indicating the result of biometrics authentication from the authentication device 2 via the communication unit 32. The control unit 31 executes an operation of controlling lock executed with the locking mechanism 34 in accordance with the result of biometrics authentication executed with the authentication device 2 (ST47).

For example, when the control unit 31 receives a response indicating success in biometrics authentication from the authentication device 2, the control unit 31 unlocks the part 4 locked with the locking mechanism 34 to enable detachment of the part 4. In addition, when the control unit 31 receives a response indicating failure in biometrics authentication from the authentication device 2, the control unit 31 maintains the part 4 in the locked state with the locking mechanism 34 to perform control to prevent detachment of the part 4.

In addition, the processor 21 transmits a response indicating a result of biometrics authentication using the fingerprint image serving as the biological information to the information terminal 1 with the first communication unit 25 (ST46).

The control unit 11 of the information terminal 1 receives the response indicating a result of biometrics authentication from the authentication device 2 via the communication unit 32. The control unit 11 notifies a result of biometrics authentication with the authentication device 2 (ST48). For example, when the biometrics authentication with the authentication device 2 succeeds, the control unit 11 notifies, with the user interface 13, that the biometrics authentication has succeeded or the part 4 is detachable. In addition, when the biometrics authentication ends in failure, the control unit 11 may notify, with the user interface 13, that the biometrics authentication has ended in failure or the part 4 is not detachable.

As described above, in the authentication system according to the embodiment, the authentication device executing biometrics authentication is provided as an external device different from the apparatus main body and the part to be attached to the apparatus main body. This structure enables operation of controlling the locking mechanism in the apparatus main body in accordance with the result of biometrics authentication with the authentication device serving as the external device.

In addition, in the first authentication processing, the authentication device executes biometrics authentication in accordance with a request from the apparatus main body, and the apparatus main body controls the locking mechanism in accordance with the result of the biometric authentication. This structure enables biometrics authentication with the authentication device when the apparatus main body detects an operation to unlock the part, such as an operation of detaching the part.

In addition, in the second authentication processing, the authentication device executes biometrics authentication in accordance with an instruction from the information terminal, and the apparatus main body controls the locking mechanism in accordance with the result of the biometric authentication. This structure enables control of the locking state with the apparatus main body while biometrics authentication is executed by remote operation.

The following is an explanation of a first example (first temporary use processing) of temporary use processing of executing temporary use setting to set the part 4 to be temporarily available without biometrics authentication in the authentication system.

Figure 7:
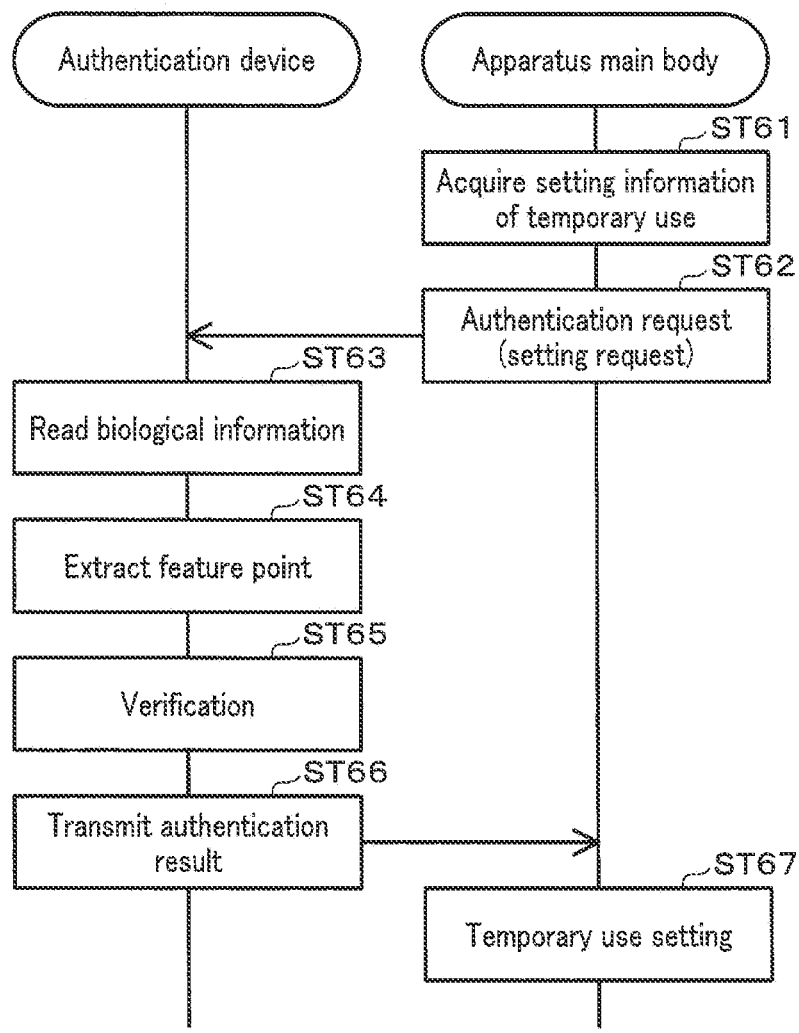
FIG. 7 is a timing chart for explaining first temporary use processing in the authentication system according to the embodiment.

FIG. 7 is a timing chart for explaining first temporary use processing in the authentication system.

Temporary use processing is processing of setting, for example, the number of times with which use (detachment) of the part 4 is temporarily enabled without biometrics authentication, as temporary use setting. In addition, the first temporary use processing is processing of executing biometrics authentication with the authentication device 2 in accordance with a request from the apparatus main body 3, and executing temporary use setting when the biometrics authentication succeeds.

The control unit 31 of the apparatus main body 3 acquires setting information of temporary use designated by the user (ST61). For example, the control unit 31 changes to a temporary use setting mode in response to the user's operation. The user inputs, for example, the number of times with which the part 4 is can be used (can be used by another person) without biometrics authentication as temporary use setting using the user interface 33.

When the control unit 31 acquires setting information of temporary use input by the user, the control unit 31 requests the authentication device 2 to execute user authentication to verify that the user is the authorized user of the part 4. The control unit 31 communicates with the authentication device 2 with the communication unit 32, and transmits a command to request biometrics authentication to the authentication device 2 (ST62). In this operation, the control unit 31 transmits identification information including the part ID of the part 4 attached to the apparatus main body 3, together with the command requesting biometrics authentication. In the same manner as each processing described above, the identification information may include identification information (apparatus ID) of the apparatus main body 3, or include the apparatus ID and the part ID.

The authentication device 2 receives a command requesting biometrics authentication from the apparatus main body 3 with the second communication unit 26. When the processor 21 of the authentication device 2 receives a command requesting registration of biological information from the apparatus main body 3, the processor 21 reads an image including a fingerprint image serving as the biological information of the operator using the biosensor 27 (ST63). In this operation, the operator's finger is placed in the reading position of the biosensor 27. As another example, the biosensor 27 may execute reading of an image in response to sensing of placement of the operator's finger.

The biosensor 27 transmits the read image (read image) to the MPU 28. The MPU 28 acquires a fingerprint image serving as the biological information included in the read image from the biosensor 27. When the MPU 28 acquires biological information from the image read with the biosensor 27, the MPU 28 extracts feature point information in the acquired fingerprint image (ST64). The MPU 28 transmits the extracted feature point information as the biological information of the operator to the processor 21. In this manner, the processor 21 acquires the feature point information of the fingerprint image of the operator from the MPU 28.

When the processor 21 acquires the feature point information of the fingerprint image of the operator, the processor 21 executes biometrics authentication by collating the feature point information of the fingerprint image of the operator with the feature point information of the fingerprint image of the registrant (ST65). The processor 21 specifies the registrant who is the user of the part 4 on the basis of the identification ID received together with the command, and acquires feature point information of the fingerprint image of the specified registrant. The processor 21 executes authentication processing of collating the feature point information of the fingerprint image of the operator read with the biosensor 27 with the feature point information of the fingerprint image of the registrant and determining whether the fingerprint images belong to the same person.

For example, the processor 21 inputs the feature point information of the fingerprint image of the operator acquired this time with the feature point information of the fingerprint image of the registrant to cause the MPU 28 to calculate similarity. The processor 21 acquires the calculated similarity from the MPU 28. When the processor 21 acquires the similarity, the processor 21 determines whether the similarity exceeds a predetermined threshold (threshold with which it is determined that the operator and the registrant are the same person). When the similarity exceeds the threshold, the processor 21 identifies the operator whose biological information has been read with the biosensor 27 as the registrant, that is, the processor 21 determines that the pieces of the biological information belong to the same person. When the similarity is equal to or smaller than the threshold, the processor 21 determines that the operator whose biological information has been read with the biosensor 27 has not been identified as the registrant.

When biometrics authentication by verification of pieces of feature point information is finished, the processor 21 transmits a response including a result of biometrics authentication using the fingerprint image serving as the biological information to the apparatus main body 3 with the second communication unit 26 (ST66). The processor 21 may display the result of biometrics authentication on a display provided on the authentication device 2 or the like.

The control unit 31 of the apparatus main body 3 receives the response indicating the result of biometrics authentication from the authentication device 2 via the communication unit 32. The control unit 31 executes temporary use setting in accordance with the result of the biometrics authentication executed with the authentication device 2 (ST67). For example, when the control unit 31 receives a response indicating success in biometrics authentication from the authentication device 2, the control unit 31 stores the setting information of temporary use input by the user, and sets the temporary use setting valid. In addition, when the control unit 31 receives a response indicating failure in biometrics authentication from the authentication device 2, the control unit 31 cancels the input temporary use setting, and notifies with the UI 33 or the like that the temporary use setting is not applicable.

In addition, the temporary use setting is, for example, permitting detachment of the part 4 only the set number of times without biometrics authentication. This is control setting to temporarily (only the set number of times) permit a person other than the authorized user to attach the part 4 to another apparatus main body and use it. In this case, the control unit 11 of the apparatus main body 3 is capable of executing control to set the lock executed with the locking mechanism 34 free only the set number of times to detach the part 4, as the temporary use setting.

The following is an explanation of a second example (second temporary use processing) of temporary use processing of executing setting to set the part 4 to be temporarily available without biometrics authentication in the authentication system.

Figure 8:
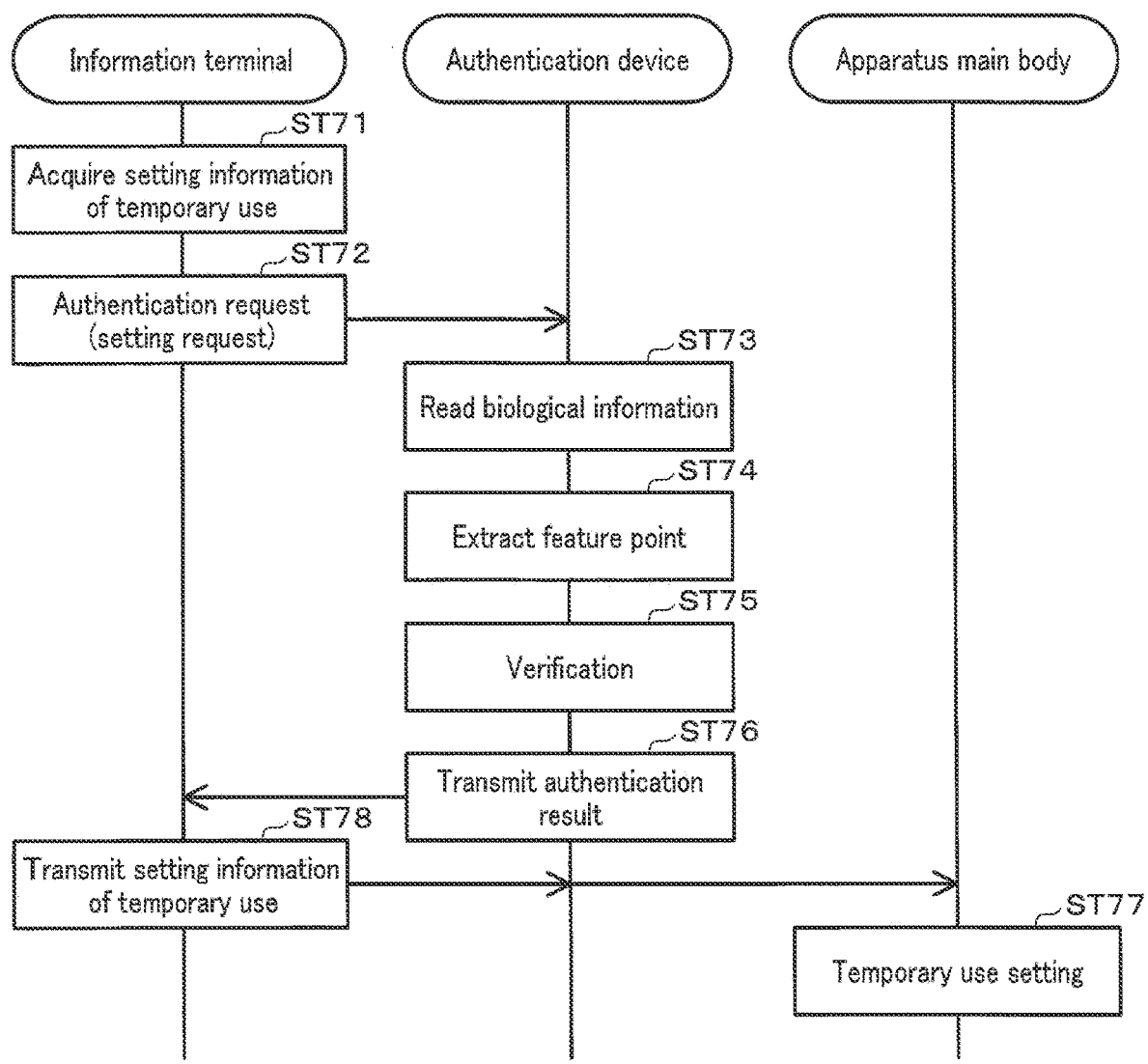
FIG. 8 is a timing chart for explaining second temporary use processing in the authentication system according to the embodiment.

FIG. 8 is a timing chart for explaining second temporary use processing in the authentication system.

The second temporary use processing is processing of executing biometrics authentication with the authentication device 2 in accordance with a request from the information terminal 1, and executing temporary use setting of the part 4 with the apparatus main body 3 when the biometrics authentication succeeds.

First, the control unit 11 of the information terminal 1 acquires setting information of temporary use for the designated part 4 input using the user interface 13 (ST71). For example, the control unit 11 of the information terminal 1 causes the operator to select the part for which temporary use setting is to be executed, and to input setting information of temporary use for the selected part with the user interface 13. The control unit 11 of the information terminal 1 may cause the operator to select the apparatus main body 3 to which the part 4 to be subjected to temporary use setting is attached, and thereafter to input setting information of temporary use.

When the control unit 11 acquires setting information of temporary use, the control unit 11 communicates with the authentication device 2 with the communication unit 12, and transmits a command requesting biometrics authentication to the authentication device 2 (ST72). In this operation, the control unit 11 transmits identification ID including the identification information (part ID) of the part for which temporary use setting is to be executed, together with the command requesting biometrics authentication. The identification ID may be identification information (apparatus ID) of the apparatus main body 3, or include the apparatus ID and the part ID.

The authentication device 2 receives a command requesting biometrics authentication from the information terminal 1 with the first communication unit 25. When the processor 21 of the authentication device 2 receives a command requesting biometrics authentication from the information terminal 1, the processor 21 reads an image including a fingerprint image serving as the biological information using the biosensor 27 (ST73). In this operation, the operator's finger is placed in the reading position of the biosensor 27. As another example, the biosensor 27 may execute reading of an image in response to sensing of placement of the operator's finger in the reading position.

The biosensor 27 transmits the read image (read image) to the MPU 28. The MPU 28 acquires a fingerprint image serving as the biological information of the operator included in the read image from the biosensor 27. When the MPU 28 acquires biological information from the image read with the biosensor 27, the MPU 28 extracts feature point information in the acquired fingerprint image (ST74). The MPU 28 transmits the extracted feature point information as the biological information of the operator to the processor 21. In this manner, the processor 21 acquires the feature point information of the fingerprint image of the operator from the MPU 28.

When the processor 21 acquires the feature point information of the fingerprint image of the operator, the processor 21 executes biometrics authentication by collating the feature point information of the fingerprint image of the operator with the feature point information of the fingerprint image of the registrant (ST75). The processor 21 specifies the registrant who is the user of the part 4 on the basis of the identification ID received together with the command, and acquires feature point information of the fingerprint image of the specified registrant. The processor 21 executes authentication processing of collating the feature point information of the fingerprint image read with the biosensor 27 with the feature point information of the fingerprint image of the registrant and determining whether the fingerprint images belong to the same person.

For example, the processor 21 inputs the feature point information of the fingerprint image acquired this time with the feature point information of the fingerprint image of the registrant to cause the MPU 28 to calculate similarity. The processor 21 acquires the calculated similarity from the MPU 28. When the processor 21 acquires the similarity, the processor 21 determines whether the similarity exceeds a predetermined threshold (threshold with which it is determined that the operator and the registrant are the same person). When the similarity exceeds the threshold, the processor 21 identifies the operator whose biological information has been read with the biosensor 27 as the registrant, that is, the processor 21 determines that the pieces of the biological information belong to the same person. When the similarity is equal to or smaller than the threshold, the processor 21 determines that the operator whose biological information has been read with the biosensor 27 has not been identified as the registrant.

When personal authentication with biological information is finished, the processor 21 transmits a response indicating a result of biometrics authentication using the fingerprint image serving as the biological information to the information terminal 1 with the first communication unit 25 (ST76).

The control unit 11 of the information terminal 1 receives the response indicating the result of biometrics authentication from the authentication device 2 via the communication unit 32.

After the control unit 11 receives the result of biometrics authentication, when the biometrics authentication with the authentication device 2 succeeds, the control unit 11 transmits the setting information of temporary use to the apparatus main body 3 via the authentication device 2 (ST78). When the biometrics authentication ends in failure, the control unit 11 notifies, with the user interface 13, that the biometrics authentication has ended in failure or the temporary use setting is impossible. In this operation, the control unit 11 may notify, with the user interface 13, that the biometrics authentication has succeeded or temporary setting is set, when biometrics authentication with the authentication device 2 succeeds.

In addition, after biometrics authentication with the authentication device 2 succeeds, the control unit 31 of the apparatus main body 3 acquires setting information of temporary setting from the information terminal 1. When the control unit 31 acquires setting information of temporary setting, the control unit 31 executes temporary use setting to enable temporary use of the part 4 on the basis of the acquired setting information (ST77).

The control unit 11 of the information terminal 1 may transmit setting information of temporary use setting together with a command requesting biometrics authentication. In this case, the processing at ST78 should be omitted, and the authentication device 2 should transmit setting information of temporary use setting to the apparatus main body 3 when biometrics authentication succeeds.

The following is an explanation of a control example of the locking mechanism 34 in accordance with temporary use setting in the apparatus main body 3 in the authentication system according to the embodiment.

FIG. 9 is a flowchart for explaining a control example of the locking mechanism 34 in accordance with temporary use setting in the apparatus main body 3.

In this example, an explanation is made on the assumption that the temporary use setting is setting the number of times (the permissible number of times of temporary use) which the part 4 can be detached without personal authentication. In addition, suppose that the control unit 11 counts the number of times (the number of times of temporary use) with which the part 4 has been detached without personal authentication, with a counter (temporary use counter) set on the memory in the control unit 11.

The control unit 31 of the apparatus main body 3 detects user's execution of a detachment operation (unlocking operation) to detach the part 4 (ST81). When the control unit 31 detects a detachment operation for the part 4, the control unit 31 determines whether personal authentication to detach the part 4 is unnecessary (ST82). For example, in the case where the permissible number of times of temporary use is set, the control unit 31 determines that personal authentication is unnecessary when the number of times of temporary use counted with the temporary use counter is equal to or smaller than the permissible number of times of temporary use. When the number of times of temporary use exceeds the permissible number of times of temporary use or when no permissible number of times of temporary use is set, the control unit 31 determines that personal authentication is necessary.

When the control unit 31 determines that personal authentication is unnecessary (YES at ST82), the control unit 31 counts up with the temporary use counter (ST83) and unlocks the part 4 locked with the locking mechanism 34 to enable detachment of the part 4 (ST84). In this manner, the apparatus main body 3 enables detachment of the part 4 without personal authentication, as long as the number of time of temporary use is equal to or smaller than the permissible number of times of temporary use. The control unit 11 may counts up with the temporary use counter when the control unit 11 detects detachment of the part 4.

In addition, when the control unit 31 determines that personal authentication is necessary (NO at ST82), the control unit 31 requests the authentication device 2 to execute biometrics authentication via the communication unit 32 (ST85). For example, the control unit 31 acquires a result of biometrics authentication executed with the authentication device 2 by processing similar to the processing at ST32 to ST37 described above. When biometrics authentication with the authentication device 2 succeeds (YES at ST86), the control unit 31 unlocks the part 4 locked with the locking mechanism 34 to enable detachment of the part 4 (ST84). In addition, when biometrics authentication with the authentication device 2 succeeds (NO at ST86), the control unit 31 maintains the part 4 in the locked state with the locking mechanism 34, and notifies, with the user interface 33, that the part 4 cannot be detached because identity verification is impossible (ST87).

The processing described above enables the apparatus main body in the authentication system to execute temporary setting enabling detachment of the part without personal authentication, and permits detachment of the attached part without personal authentication under the temporary setting condition. With this structure, the authentication system enables temporary detachment of the part attached to the apparatus main body without personal authentication, and enables use of the part by a person other than the authorized user.

The following is an explanation of a first example (first deletion processing) of deletion processing of deleting biological information registered in the authentication device 2 in the authentication system.

Figure 10:
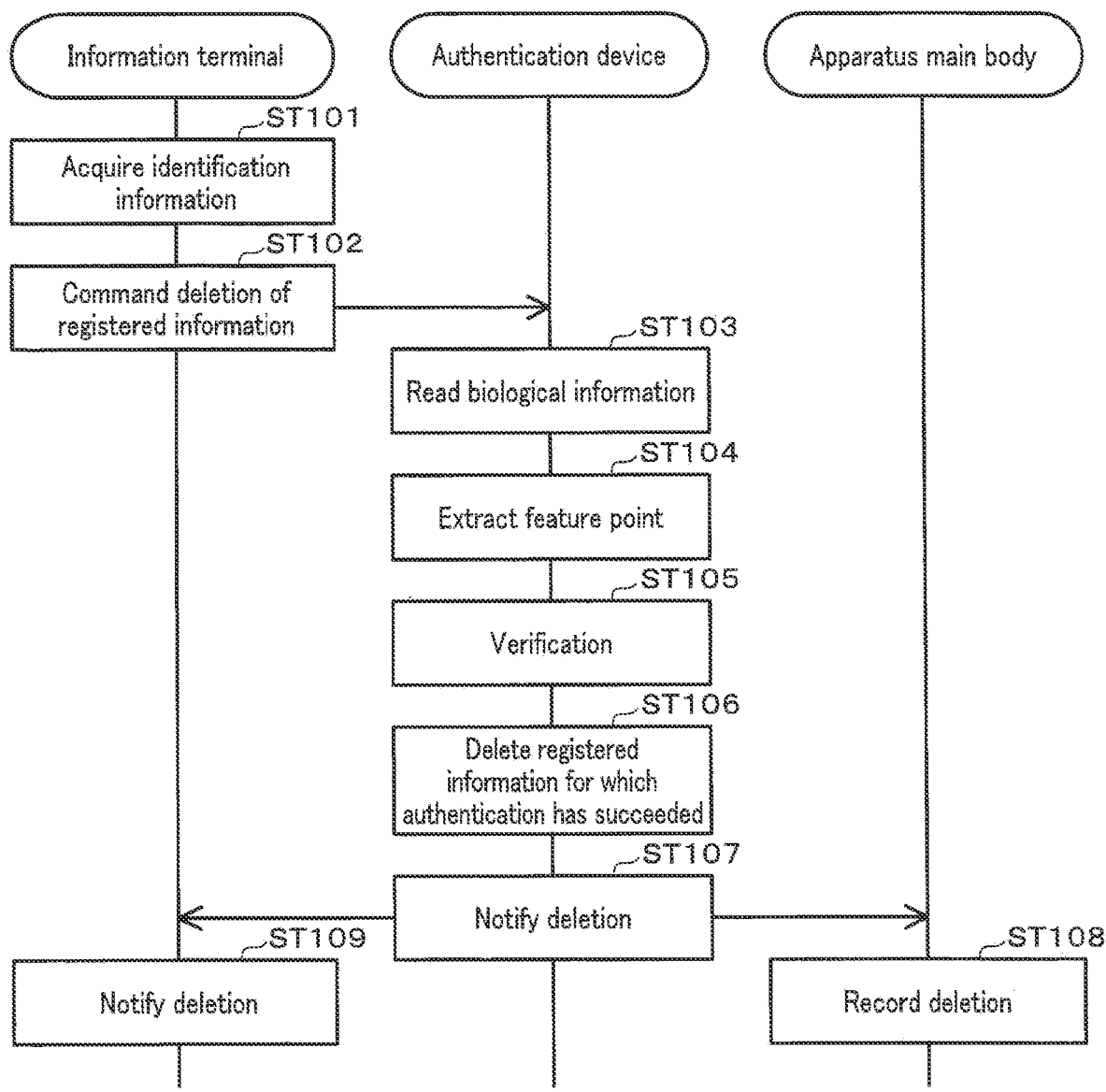
FIG. 10 is a timing chart for explaining first deletion processing in the authentication system according to the embodiment.

FIG. 10 is a timing chart for explaining first deletion processing in the authentication system.

In this example, suppose that the first deletion processing is processing of deleting the biological information of the authorized user for the part 4 having been registered in the authentication device 2, in accordance with a request from the information terminal 1, such as a smartphone operated by the user (manager).

First, the manager designates identification information corresponding to the biological information serving as the deletion target using the user interface 13 of the information terminal 1, and commands deletion of the biological information. For example, the control unit 11 of the information terminal 1 causes the manager to designate the part serving as the target using the user interface 13, and causes the manager to command deletion of the biological information registered in associated with the part. In this operation, the control unit 11 may cause the manager to select the part for which the biological information is to be deleted from the parts for which the biological information have been registered, or may cause the manager to input the part ID of the part serving as the deletion target. In this case, the control unit 11 should acquire the part ID indicating the part corresponding to the biological information as the identification information corresponding to the biological information serving as the deletion target.

In addition, when the biological information is registered in association with the apparatus ID, the control unit 11 may cause the manager to designate the apparatus main body corresponding to the biological information serving as the deletion target, and use the apparatus ID of the designated apparatus main body as the identification information corresponding to the biological information serving as the deletion target. As another example, when the biological information is registered in association with user information, such as the user name, the control unit 11 may cause the manager to designate the user having the biological information serving as the deletion target, and use user information of the designated user as the identification information corresponding to the biological information serving as the deletion target.

The control unit 11 of the information terminal 1 acquires identification information corresponding to the biological information serving as the deletion target and designated with the user interface 13 (ST101). When the control unit 11 acquires the identification information corresponding to the biological information serving as the deletion target, the control unit 11 communicates with the authentication device 2 with the communication unit 12, and transmits a command requesting deletion of biological information corresponding to the acquired identification information to the authentication device 2 (ST102).

The authentication device 2 receives the command from the information terminal 1 with the first communication unit 25. When the command received from the information terminal 1 is a command requesting deletion of biological information, the processor 21 of the authentication device 2 executes deletion processing for biological information. The processor 21 of the authentication device 2 executes biometrics authentication authenticating the registrant oneself in the deletion processing for biological information.

Specifically, the processor 21 causes the biosensor 27 to acquire a fingerprint image serving as biological information. For example, the processor 21 starts the biosensor 27 via the MPU 28 or the like. In this operation, suppose that deletion of biological information is executed when biometrics authentication has verified that the operator is the registrant oneself. For this reason, the person (registrant) who is going to deleting the biological information is supposed to place the finger on which a fingerprint is formed in a predetermined reading position in the biosensor 27.

The person (registrant) who is going to deleting the biological information may be the same person as, or a different person from, the manager who is operating the information terminal 1. The latter case achieves an operation in which the manager who is not the registrant causes the registrant to execute biometrics authentication while performing remote operation with the information terminal 1.

The biosensor 27 starts in accordance with an instruction from the processor 21. The started biosensor 27 acquires a read image including a fingerprint image from the person's finger placed in the predetermined reading position (ST103). The biosensor 27 transmits the acquired read image to the MPU 28. The MPU 28 acquires a fingerprint image from the read image from the biosensor 27, and extracts feature point information in the acquired fingerprint image (ST104). The MPU 28 transmits the extracted feature point information as biological information of the registrant to the processor 21.

The processor 21 acquires feature point information of the fingerprint image read with the biosensor 27 from the MPU 28. When the processor 21 acquires feature point information of the fingerprint image read with the biosensor 27, the processor 21 executes biometrics authentication by collating the feature point information of the read fingerprint image with the feature point information of the fingerprint image of the registrant (ST105). The processor 21 acquires the feature point information of the fingerprint image serving as the biological information of the registrant corresponding to the identification information received together with the command. The processor 21 executes biometrics authentication of collating the feature point information of the fingerprint image read with the biosensor 27 with the feature point information of the fingerprint image of the registrant and determining whether the fingerprint images belong to the same person on the basis of whether the similarity is larger than or smaller than the set threshold.

When the biometrics authentication succeeds, the processor 21 deletes the biological information of the registrant (106). The processor 21 deletes the feature point information of the fingerprint image of the registrant registered as a template in the data memory 24. As another example, the processor 21 may write that the feature point information (biological information) of the fingerprint image of the registrant is invalid.

When the processor 21 deletes biological information (biological information of the registrant) corresponding to the designated identification information, the processor 21 transmits a response indicating deletion of biological information corresponding to the designated identification information to the information terminal 1 via the first communication unit 25 (ST107).

When the control unit 11 of the information terminal 1 receives the response indicating finish of deletion of the biological information from the authentication device 2 via the communication unit 12, the control unit 11 notifies the manager (operator of the information terminal 1) of finish of registration of the biological information using the user interface 13 (ST108).

The processor 21 of the authentication device 2 also notifies the apparatus main body 3 of deletion of the biological information of the authorized user for the part 4 via the second communication unit 26 (ST107). The apparatus main body 3 receives the notification of deletion of the biological information with the communication unit 32. When the control unit 31 of the apparatus main body 3 receives the notification of deletion of the biological information, the control unit 31 records deletion of the biological information of the authorized user for the part 4 (ST109).

For example, the control unit 31 records information indicating that the biological information of the authorized user for the part 4 has been deleted (no authorized users are registered) in the memory in the control unit 31. This structure enables the control unit 31 to determine that biological information of a new authorized user can be registered for the part 4, when it is recorded that no biological information of the authorized user is registered (biological information has been deleted).

The following is an explanation of a second example (second deletion processing) of deletion processing of deleting biological information registered in the authentication device 2 in the authentication system.

FIG. 11 is a timing chart for explaining second deletion processing for biological information in the authentication system.

In this example, suppose that the second deletion processing is processing of deleting the biological information registered in the authentication device 2, in accordance with a request from the apparatus main body 3 operated by the user.

First, the user commands deletion of the biological information by operating the user interface 33 in the apparatus main body 3 in a state in which the part 4 is attached thereto. The user (supposing that the user is the registrant herein) who has commanded deletion of the biological information places one's finger provided with a fingerprint to be registered in a reading position of the biosensor 27 in the authentication device 2.

The control unit 31 of the apparatus main body 3 acquires identification information corresponding to the biological information serving as the deletion target (ST111). In this example, the control unit 31 acquires part information including the part ID of the attached part 4, as the identification information corresponding to the biological information serving as the deletion target.

When the control unit 31 acquires the identification information corresponding to the biological information serving as the deletion target, the control unit 31 designates the acquired identification information, and transmits a command requesting deletion of the biological information corresponding to the designated identification information to the authentication device 2 communicating with the communication unit 32 (ST112).

The authentication device 2 receives the command requesting registration of the biological information from the apparatus main body 3 with the second communication unit 26. When the processor 21 of the authentication device 2 receives a command requesting registration of the biological information from the apparatus main body 3, the processor 21 executes deletion of the biological information by processing similar to those at ST103 to ST106 described above (ST113 to ST116).

When the processor 21 deletes the biological information, the processor 21 transmits a response indicating finish of deletion of the biological information of the authorized user for the part 4 to the apparatus main body 3 via the second communication unit 26 (ST117).

The control unit 31 of the apparatus main body 3 receives the response indicating deletion of the biological information from the authentication device 2 via the communication unit 32. When the control unit 31 receives the response indicating deletion of the biological information, the control unit 31 records deletion of the biological information of the authorized user for the part 4 (ST118). For example, the control unit 31 records information indicating that the biological information of the authorized user for the part 4 has been deleted (no authorized users are registered) in the memory in the control unit 31. This structure enables the control unit 31 to determine that biological information of a new authorized user can be registered for the part 4, when it is recorded that no biological information of the authorized user is registered (biological information has been deleted).

With the first and the second deletion processing described above, the authentication system is enabled to delete the biological information of the authorized user for the part attached to the apparatus main body, and set the system to a state in which no authorized users for the part are registered. This structure enables the authentication system to not only strictly control the authorized user for the part with the biological information but also delete the biological information of the authorized user authenticated by biometrics authentication. This structure enables easily reset of the authorized user for the part to transfer the part 4 to another person and/or sell the part 4 to a third person.

The following is an explanation of a first example (first transfer processing) of transfer processing of transferring (transferring the part to another person) the usage authority with biological information registered in the authentication device 2 in the authentication system.

Figure 12:
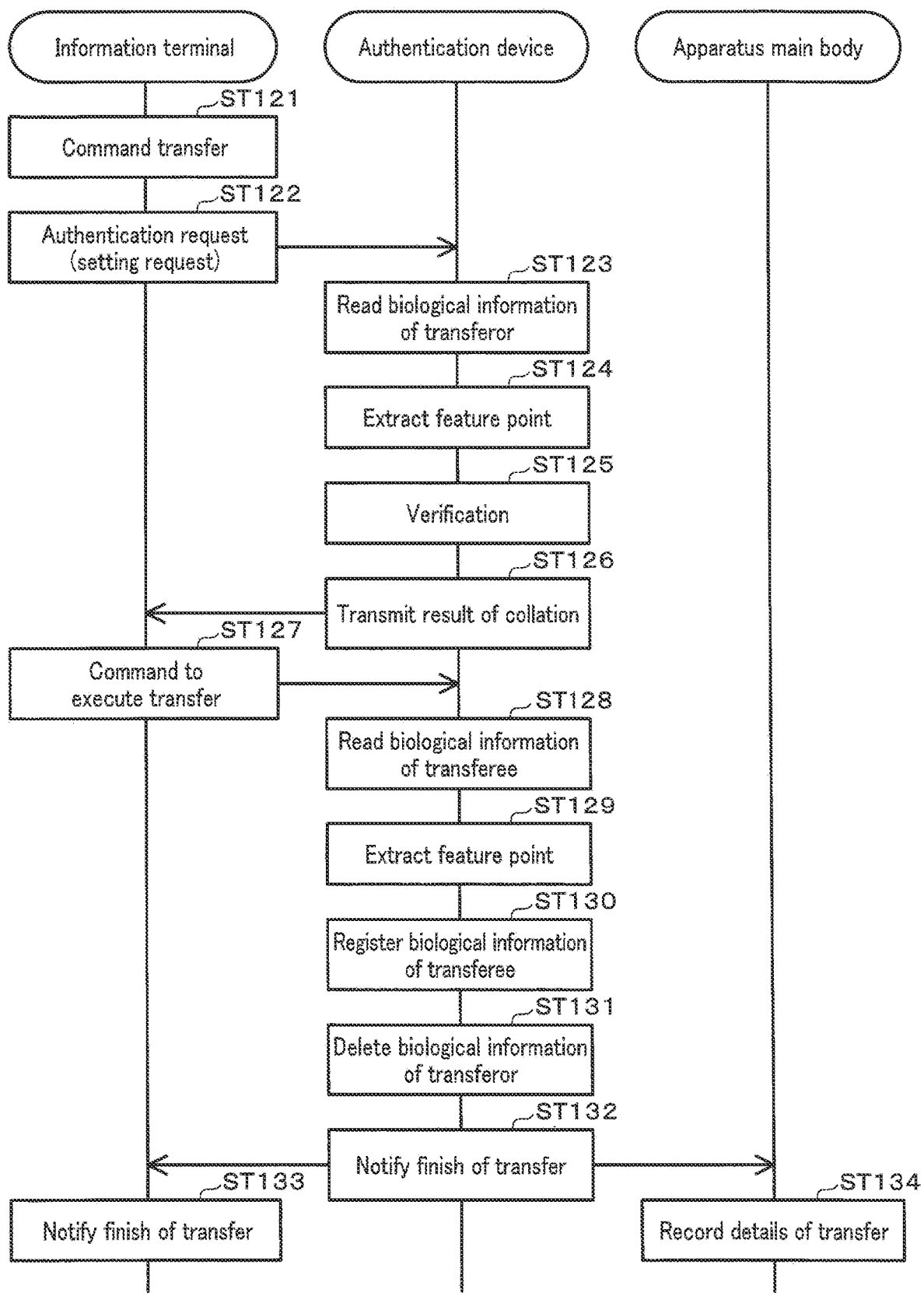
FIG. 12 is a timing chart for explaining first transfer processing in the authentication system according to the embodiment.

FIG. 12 is a a timing chart for explaining first transfer processing in the authentication system.

Transfer of the usage authority can be achieved by executing the deletion processing and the registration processing described above, but transfer processing achieving the procedures for transferring the usage authority as a series of processes can be executed in the authentication system according to the present embodiment. As the first transfer processing, a processing example will be explained hereinafter. In the processing example, the usage authority for the part 4 registered in the authentication device 2 is transferred from the transferor (the current authorized user) to the transferee (new authorized user) in accordance with a request from the information terminal 1, such as a smartphone operated by the user (manager).

First, the manager designates identification information indicating the part serving as the transfer target using the user interface 13 of the information terminal 1, and commands transfer (transfer of the usage authority) of the part. For example, the control unit 11 of the information terminal 1 causes the manager to designate the part serving as the transfer target using the user interface 13, and causes the manager to command transfer of the usage authority of the part. The control unit 11 may cause the manager to select the part to be transferred from the parts for which the biological information has been registered, or to input the part ID of the part serving as the transfer target.

In addition, when the biological information is registered in association with the apparatus ID, the control unit 11 may cause the manager to designate the apparatus main body serving as the transfer target, and use the apparatus ID of the designated apparatus main body as the identification information corresponding to the biological information serving as the transfer target. As another example, when the biological information is registered in association with user information, such as the user name of the authorized user, the control unit 11 may cause the manager to designate the user who is the authorized user of the part serving as the transfer target, and set the part usage authority of which is set for the designated user as the transfer target.

The control unit 11 of the information terminal 1 acquires a request to execute transfer processing designating identification information indicating the part serving as the transfer target and input with the user interface 13 (ST121). When the control unit 11 acquires the identification information indicating the part serving as the transfer target, the control unit 11 transmits a command requesting transfer processing for the part indicated with the acquired identification information to the authentication device 2 communicating with the communication unit 12 (ST122).

The authentication device 2 receives the command from the information terminal 1 with the first communication unit 25. When the command received from the information terminal 1 is a command requesting transfer of the part, the processor 21 of the authentication device 2 verifies first that the transferor is the registrant oneself by biometrics authentication.

Specifically, the processor 21 acquires a fingerprint image serving as biological information of the transferor using the biosensor 27 (ST123). For example, the processor 21 starts the biosensor 27 via the MPU 28 or the like. In this operation, the transferor places the finger on which a fingerprint is formed in a predetermined reading position in the biosensor 27, and the processor 21 acquires a read image including the fingerprint image of the transferor with the biosensor 27.

The transferor (registrant) may be the same person as, or a different person from, the manager who is operating the information terminal 1. The latter case achieves an operation in which the manager who is not the transferor operates the information terminal 1 to cause the registrant to execute biometrics authentication.

The biosensor 27 starts in accordance with an instruction from the processor 21. The started biosensor 27 acquires a read image including a fingerprint image from the person's finger placed in the predetermined reading position. The MPU 28 acquires a fingerprint image from the read image from the biosensor 27, and extracts feature point information in the acquired fingerprint image (ST124). The MPU 28 transmits the extracted feature point information as biological information of the registrant to the processor 21.

The processor 21 acquires feature point information extracted from the fingerprint image read with the biosensor 27 with the MPU 28. When the processor 21 acquires feature point information of the fingerprint image read with the biosensor 27, the processor 21 executes biometrics authentication by collating the feature point information of the read fingerprint image with the feature point information of the fingerprint image of the registrant (ST125). The processor 21 executes, for the transferor, biometrics authentication of specifying the biological information of the registrant corresponding to the identification information received together with the command, collating the feature point information of the fingerprint image of the specified registrant with the feature point information of the fingerprint image read with the biosensor 27, and determining whether the fingerprint images belong to the same person on the basis of whether the similarity is larger than or smaller than the threshold.

When biometrics authentication for the transferor is finished, the processor 21 transmits a response indicating a result of biometrics authentication indicating whether the transferee is the registrant to the information terminal 1 via the first communication unit 25 (ST126).

The control unit 11 of the information terminal 1 receives the response indicating the result of biometrics authentication for the transferor from the authentication device 2 via the communication unit 12. When the control unit 11 receives the response indicating the result of biometrics authentication, the control unit 11 determines whether it has been verified that the transferee is the registrant. When it fails to verify that the transferor is the registrant, the control unit 11 finishes the transfer processing because biometrics authentication for the transferor is impossible.

When biometrics authentication with the authentication device 2 verifies that the transferor is the registrant, the control unit 11 receives a command to execute transfer from the manager using the user interface 13. When a command to execute transfer is input, the control unit 11 transmits the command to execute transfer to the authentication device 2 (ST127). In addition to transmission of the command to execute transfer to the authentication device 2, the control unit 11 executes guidance with the user interface 13 or the like to cause the biosensor to read biological information of the transferee. In accordance with such guidance, the transferee places one's finger having a fingerprint for registration in the reading position of the biosensor 27.

By contrast, when the processor 21 of the authentication device 2 receives the command to execute transfer from the information terminal 1 with the first communication unit 25, the processor 21 acquires the fingerprint image serving as the biological information of the transferee using the biosensor 27. For example, the processor 21 starts the biosensor 27 via the MPU 28 or the like, and the biosensor 27 acquires a read image including a fingerprint image of the transferee's finger placed in the reading position (ST128). The biosensor 27 transmits the acquired read image to the MPU 28. The MPU 28 acquires the fingerprint image from the read image from the biosensor 27. The MPU 28 extracts feature point information in the acquired fingerprint image (ST129). The MPU 28 transmits the extracted feature point information as biological information of the transferee to the processor 21.

When the processor 21 acquires feature point information of the fingerprint image from the MPU 28, the processor 21 generates a template (data acquired by extracting feature points for biometrics authentication) on the basis of the acquired feature point information of the fingerprint image.

When the processor 21 generates a template, the processor 21 stores (registers) the generated template as biological information of the transferee in association with the identification information in the data memory 24 (ST130). In this case, the processor 21 deletes the biological information of the transferor having already been registered in association with the identification information (ST131). In this manner, the biological information registered in association with the identification information is rewritten from the biological information of the transferor to the biological information of the transferee. Specifically, because the biological information of the registrant corresponding to the identification information is changed to the biological information of the transferee, transfer of the usage authority of the part indicated with the identification information is finished.

When the transfer is finished, the processor 21 transmits a response indicating finish of transfer (rewriting of biological information of the registrant) of the usage authority corresponding to the designated identification information to the information terminal 1 via the first communication unit 25 (ST132).

The control unit 11 of the information terminal 1 receives the response indicating finish of transfer from the authentication device 2 with the communication unit 12. When the control unit 11 receives the response indicating finish of transfer, the control unit 11 notifies the manager (operator of the information terminal 1) of finish of transfer of the usage authority with the user interface 33 or the like (ST133).

In addition, when transfer is finished, the processor 21 also notifies the apparatus main body 3 to which the part 4 indicated with the identification information is attached of finish of transfer (rewriting of biological information of the registrant) of the usage authority via the second communication unit 26 (ST132).

The apparatus main body 3 receives the notification indicating finish of transfer from the authentication device 2 with the communication unit 32. When the control unit 31 of the apparatus main body 3 receives the notification of finish of transfer from the authentication device 2, the control unit 31 records that the biological information of the authorized user for the attached part 4 has been changed (transferred) (ST134). As another example, the control unit 31 may notify finish of transfer of the usage authority with the user interface 33 or the like.

The following is an explanation of a second example (second transfer processing) of transfer processing of transferring (transferring the part to another person) the usage authority with biological information registered in the authentication device 2 in the authentication system.

Figure 13:
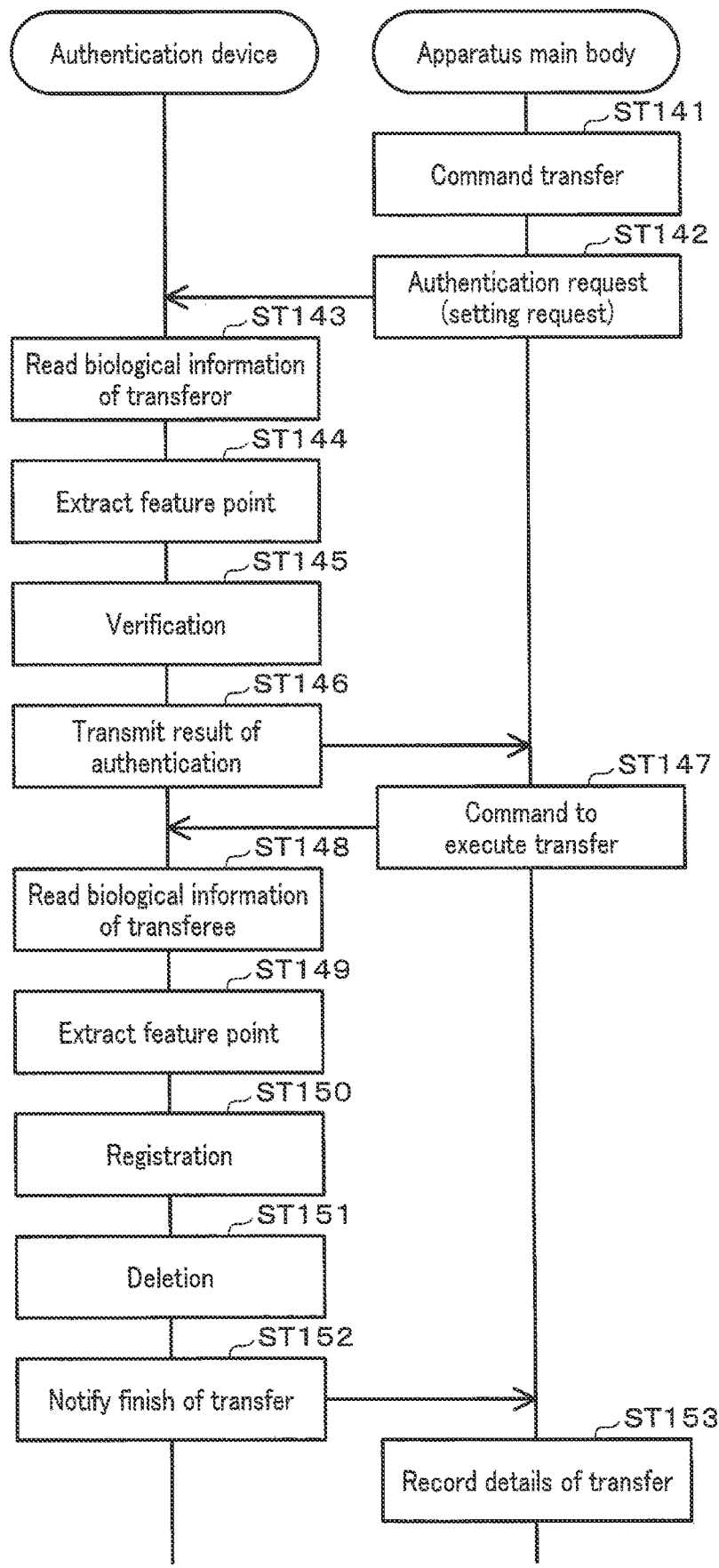
FIG. 13 is a timing chart for explaining second transfer processing in the authentication system according to the embodiment.

FIG. 13 is a timing chart for explaining second transfer processing in the authentication system.

As the second transfer processing, a processing example will be explained hereinafter. In the processing example, the usage authority for the part 4 registered in the authentication device 2 is transferred from the transferor (the current authorized user) to the transferee (new authorized user) in accordance with a request from the apparatus main body 3 operated by the user.

First, the user commands transfer (transfer of the usage authority) of the part 4 attached to the apparatus main body 3 by operating the user interface 33. The user (supposing that the user is the registrant herein) who has commanded transfer places one's finger provided with a fingerprint to be registered in a reading position of the biosensor 27 in the authentication device 2.

The control unit 31 of the apparatus main body 3 acquires identification information indicating the part 4 in accordance with the transfer instruction input with the user interface 33 (ST141), and transmits a command requesting transfer of the part indicated with the acquired identification information to the authentication device 2 communicating with the communication unit 12 (ST142).

The authentication device 2 receives the command from the information terminal 1 with the first communication unit 25. When the command received from the information terminal 1 is a command requesting transfer of the part, the processor 21 of the authentication device 2 acquires a fingerprint image serving as the biological information of the transferor using the biosensor 27 to verify that the transferor is the registrant oneself by biometrics authentication (ST143).

The biosensor 27 starts in accordance with an instruction from the processor 21, and acquires a read image including a fingerprint image from the person's finger placed in the predetermined reading position. The MPU 28 acquires a fingerprint image from the read image from the biosensor 27, and extracts feature point information in the acquired fingerprint image (ST144). The MPU 28 transmits the extracted feature point information as biological information of the registrant to the processor 21.

The processor 21 acquires feature point information extracted from the fingerprint image read with the biosensor 27 with the MPU 28. When the processor 21 acquires feature point information of the fingerprint image read with the biosensor 27, the processor 21 executes biometrics authentication by collating the feature point information of the read fingerprint image with the feature point information of the fingerprint image of the registrant (ST145). The processor 21 executes, for the transferor, biometrics authentication of collating the feature point information of the fingerprint image of the registrant serving as the biological information of the registrant corresponding to the identification information received together with the command with the feature point information of the fingerprint image read with the biosensor 27 and determining whether the fingerprint images belong to the same person.

When biometrics authentication for the transferor is finished, the processor 21 transmits a response indicating a result of biometrics authentication indicating whether the transferee has been specified or verified as the current registrant to the information terminal 1 via the second communication unit 26 (ST146).

The control unit 31 of the apparatus main body 3 receives the response indicating the result of biometrics authentication for the transferor from the authentication device 2 via the communication unit 32. When the control unit 31 receives the response indicating the result of biometrics authentication, and when biometrics authentication fails to verify that the transferor is the current registrant, the control unit 31 finishes the transfer processing because biometrics authentication for the transferor is impossible. In this case, the control unit 31 may provide guidance indicating that transfer is impossible because biometrics authentication for the transferor is impossible.

When biometrics authentication with the authentication device 2 verifies that the transferor is the current registrant, the control unit 31 receives a command (verification of execution of transfer) to execute transfer from the manager using the user interface 33. When a command to execute transfer is input, the control unit 31 transmits the command to execute transfer to the authentication device 2 (ST147). In addition to transmission of the command to execute transfer to the authentication device 2, the control unit 31 executes guidance with the user interface 33 or the like to cause the biosensor 27 to read biological information of the transferee. In accordance with such guidance, the transferee places one's finger having a fingerprint for registration in the reading position of the biosensor 27.

By contrast, the processor 21 of the authentication device 2 receives the command to execute transfer from the apparatus main body 3 with the second communication unit 26. When the processor 21 receives the command to execute transfer, the processor 21 acquires the fingerprint image serving as the biological information of the transferee using the biosensor 27. For example, the processor 21 starts the biosensor 27 via the MPU 28 or the like to execute a read image including a fingerprint image of the transferee's finger placed in the reading position with the biosensor 27 (ST148). The biosensor 27 transmits the acquired read image to the MPU 28. The MPU 28 acquires the fingerprint image from the read image from the biosensor 27. The MPU 28 extracts feature point information in the acquired fingerprint image (ST149). The MPU 28 transmits the extracted feature point information as biological information of the transferee to the processor 21.

When the processor 21 acquires feature point information of the fingerprint image from the MPU 28, the processor 21 generates a template (data acquired by extracting feature points for biometrics authentication) on the basis of the acquired feature point information of the fingerprint image. When the processor 21 generates a template, the processor 21 stores (registers) the generated template as biological information of the transferee in association with the identification information in the data memory 24 (ST150). In this case, the processor 21 deletes the biological information of the transferor having already been registered in association with the identification information (ST151). In this manner, the biological information registered in association with the identification information is rewritten from the biological information of the transferor to the biological information of the transferee. Specifically, because the biological information of the registrant corresponding to the identification information is changed to the biological information of the transferee, transfer of the usage authority of the part indicated with the identification information is finished.

When the transfer is finished, the processor 21 transmits a response indicating finish of transfer (rewriting of biological information of the registrant) of the usage authority corresponding to the designated identification information to the apparatus main body 3 via the second communication unit 26 (ST152).

The control unit 31 of the apparatus main body 3 receives the response indicating finish of transfer from the authentication device 2 with the communication unit 32. When the control unit 31 receives the response indicating finish of transfer, the control unit 31 records change (transfer) of the biological information of the authorized user for the attached part 4 (ST153). As another example, the control unit 31 may notify finish of transfer of the usage authority with the user interface 33 or the like.

By the first and the second transfer processing described above, the authentication system is enabled to rewrite the biological information of the authorized user for the part attached to the apparatus main body from the biological information of the transferor (the current registrant) to the biological information of the transferee (new registrant). This structure enables the authentication system to transfer the usage authority for the part attached to the apparatus main body from the transferor to the transferee (new registrant). Specifically, this structure enables the authentication system according to the embodiment to not only strictly control the authorized user for the part with the biological information but also rewrite the biological information of the registrant to the biological information of the transferee after verification of the transferor by biometrics authentication. This structure enables transfer of the part without deterioration of security for the part.

The embodiment described above illustrates the mode of controlling lock for the part, such as a lens, attached to the apparatus main body being a camera or the like, but the structure of controlling the locking mechanism included in the apparatus main body by biometrics authentication with the authentication device is not limited to the example described above. Specifically, the authentication system according to the embodiment described above may be applied to any system, as long as the locking mechanism is a mechanism capable of controlling the apparatus capable of communicating with the authentication device.

For example, the authentication system described above may be applied to a system controlling a locking mechanism of a locker or a case or the like. As a specific example, the authentication system may be applied to an operation in a nursing care place. In the operation, the care giver operates the information terminal to cause the authentication device to read the biological information of the care receiver. This structure enables control of the lock, such as an electronic key of the locker the usage authority of which is set for the care receiver. Such operation achieves operation of controlling the locker of the care receiver, which is difficult to operate carelessly, with the biological information of the care receiver by supporting the movement of the care receiver by the care giver while using the information terminal. Such operation enables operation of the locker or the like while security is maintained with the biological information with support by the care giver.

Some embodiments of the present invention have been described above, but the embodiments have been presented as examples, and are not intended to limit the scope of the invention. These novel embodiments can be carried out in other various forms, and various omissions, replacement, and changes are possible within the range not departing from the gist of the invention. The embodiments and/or modifications thereof are included in the scope and/or the gist of the invention, and included in the inventions in the claims and the range equivalent thereto.

The invention claimed is:

1. An authentication device comprising:
an apparatus main body interface communicating with an apparatus main body controlling a locking mechanism;
a memory storing therein biological information of a registrant having authority to release lock executed with the locking mechanism;
a biosensor acquiring biological information of an operator; and
a processor transmitting information that the operator has been authenticated as the registrant with the biological information to the apparatus main body with the apparatus main body interface and controlling the locking mechanism, when the processor determines that the biological information acquired with the biosensor and the biological information of the registrant stored in the memory are pieces of biological information of the same person; and
an information terminal interface communicating with an information terminal,
wherein the processor stores biological information acquired using the biosensor in accordance with a command from the information terminal communicating with the information terminal interface as the biological information of the registrant in the memory.

2. The authentication device according to claim 1, wherein:
when the processor receives a setting request of temporary use for the locking mechanism from the information terminal with the information terminal interface, the processor sets setting information of the temporary use in the apparatus main body when processor determines that the biological information acquired with the biosensor and the biological information of the registrant stored in the memory are pieces of biological information of the same person.

3. The authentication device according to claim 1, wherein:
when the processor receives a request to transfer the authority from the information terminal with the information terminal interface, the processor acquires biological information of a transferee of the authority with the biosensor and rewrites the biological information of the registrant from biological information of a transferor to the biological information of the transferee when the processor determines that the biological information of the transferor acquired with the biosensor and the biological information of the registrant stored in the memory are pieces of biological information of the same person.

4. The authentication device according to claim 1, wherein the processor stores biological information acquired using the biosensor in accordance with a command from the apparatus main body communicating with the apparatus main body interface as the biological information of the registrant in the memory.

5. The authentication device according to claim 1, wherein
when the processor receives a setting request of temporary use for the locking mechanism from the apparatus main body with the apparatus main body interface, the processor sets setting information of the temporary use in the apparatus main body when the processor determines that the biological information acquired with the biosensor and the biological information of the registrant stored in the memory are pieces of biological information of the same person.

6. The authentication device according to claim 1, wherein
when the processor receives a request to transfer the authority from the apparatus main body with the apparatus main body interface, the processor acquires biological information of a transferee of the authority with the biosensor and rewrites the biological information of the registrant from biological information of a transferor to the biological information of the transferee when the processor determines that the biological information of the transferor acquired with the biosensor and the biological information of the registrant stored in the memory are pieces of biological information of the same person.

7. An authentication system comprising an apparatus main body and an authentication device,
the authentication device including:
an apparatus main body interface communicating with the apparatus main body;
a memory storing therein biological information of a registrant having authority to release lock executed with a locking mechanism;
a biosensor acquiring biological information of an operator; and
a processor transmitting information that the operator has been authenticated as the registrant to the apparatus main body with the apparatus main body interface, when the processor determines that the biological information acquired with the biosensor and the biological information of the registrant stored in the memory are pieces of biological information of the same person, and
an information terminal interface communicating with an information terminal,
wherein the processor stores biological information acquired using the biosensor in accordance with a command from the information terminal communicating with the information terminal interface as the biological information of the registrant in the memory;
the apparatus main body including:
an authentication device interface communicating with the authentication device; and
a control unit comprising a processor configured to request the authentication device to execute biometrics authentication when an operation to release lock executed with the locking mechanism is detected, and to release the lock executed with the locking mechanism when the control unit receives information that the operator has been authenticated as the registrant from the authentication device.

8. An authentication system comprising an information terminal, an apparatus main body, and an authentication device,
the authentication device including:
an apparatus main body interface communicating with the apparatus main body;
an information terminal interface communicating with the information terminal;
a memory storing therein biological information of a registrant having authority to release lock executed with a locking mechanism;
a biosensor acquiring biological information of an operator; and
a processor transmitting information that the operator has been authenticated as the registrant to the apparatus main body with the apparatus main body interface, when the processor determines, in accordance with a request of biometrics authentication for the registrant, that the biological information of the operator acquired with the biosensor and the biological information of the registrant stored in the memory are pieces of biological information of the same person, the request being received from the information terminal with the information terminal interface,
wherein the processor stores biological information acquired using the biosensor in accordance with a command from the information terminal communicating with the information terminal interface as the biological information of the registrant in the memory;
the information terminal including:
a first authentication device interface communicating with the authentication device;
a user interface receiving an operation instruction input by a user; and
a first control unit comprising a processor configured to request the authentication device to execute biometrics authentication with the first authentication device interface, when a command requesting release of lock executed with the locking mechanism is input to the user interface, the apparatus main body including:
- a second authentication device interface communicating with the authentication device; and
- a second control unit comprising a processor configured to release lock executed with the locking mechanism, when the second control unit receives information that the operator has been authenticated as the registrant from the authentication device.

* * * * *